United States Patent [19]

Agazzi et al.

[11] Patent Number: 4,669,116
[45] Date of Patent: May 26, 1987

[54] NON-LINEAR ECHO CANCELLATION OF DATA SIGNALS

[75] Inventors: Oscar E. Agazzi, Berkeley; David G. Messerschmitt, Walnut Creek, both of Calif.

[73] Assignee: Regents of the University of California, Berkeley, Calif.

[21] Appl. No.: 448,418

[22] Filed: Dec. 9, 1982

[51] Int. Cl.⁴ ............................................. H04B 3/20
[52] U.S. Cl. .................................. 379/411; 370/32; 364/724
[58] Field of Search ............... 179/170.2, 170.6, 170.8; 370/32; 364/724

[56] References Cited

U.S. PATENT DOCUMENTS

| | | | |
|---|---|---|---|
| 3,647,992 | 3/1972 | Thomas | 179/170.2 |
| 3,732,410 | 5/1973 | Mackechnie | 235/181 |
| 3,922,505 | 11/1975 | Höge | 179/170.2 |
| 4,162,378 | 7/1979 | Baudoux et al. | 179/170.2 |
| 4,370,741 | 1/1983 | Haas | 370/24 |
| 4,464,746 | 8/1984 | Snijders et al. | 370/32 |
| 4,571,719 | 2/1986 | Carlqvist et al. | 370/32 |
| 4,578,544 | 3/1986 | de Verdiere et al. | 179/170.2 |

OTHER PUBLICATIONS

"A New Digital Echo Canceller for Two-Wire Subscriber Lines", Nils Holte and Steiner Stueflotten, IEEE Transactions on Communications, vol. COM-29 No. 11, Nov. 1981 pp. 1573–1575.

Primary Examiner—Gene Z. Rubinson
Assistant Examiner—R Vaas
Attorney, Agent, or Firm—Flehr, Hohbach, Test, Albritton & Herbert

[57] ABSTRACT

An echo cancellation circuit is disclosed for use with full-duplex data transmission systems. The echo canceller can operate in spite of time invariant non-linearities in the echo channel or in the implementation of the echo canceller itself (such as in D/A converters). The echo canceller receives an echo signal having linear and non-linear components and includes N linear tap weights for cancelling the non-linear components of that echo signal where M is greater than N but less than $2^N$.

8 Claims, 19 Drawing Figures

SUBSCRIBER LOOP MODEMS COMMUNICATING ON 2 WIRES. ECHO CANCELLATION TECHNIQUES ENSURE FULL DUPLEX TRANSMISSION WITH ADEQUATE CHANNEL SEPARATION

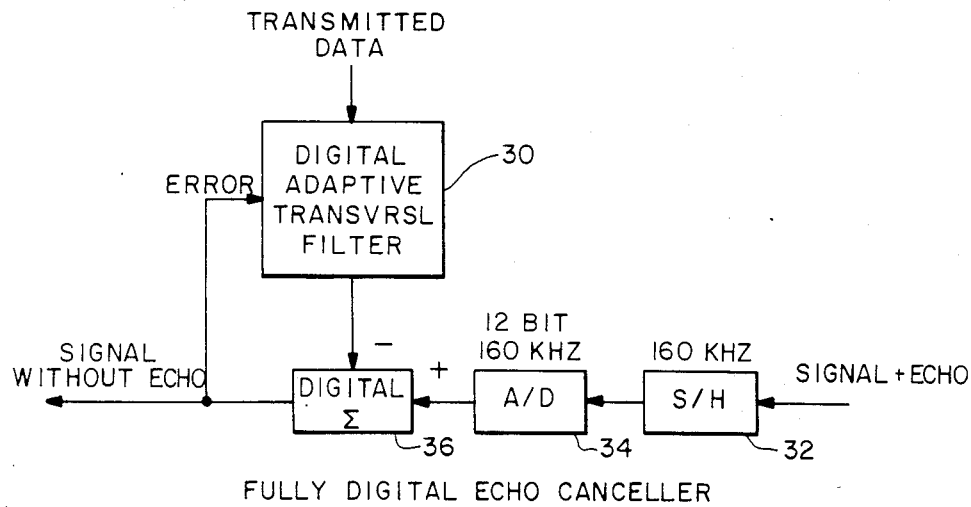
FIG.—2a
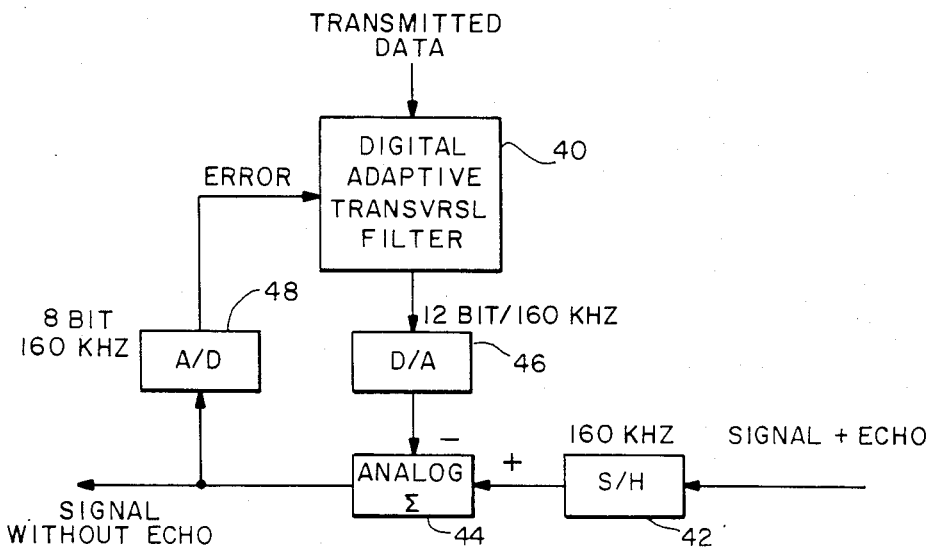
FIG.—2b

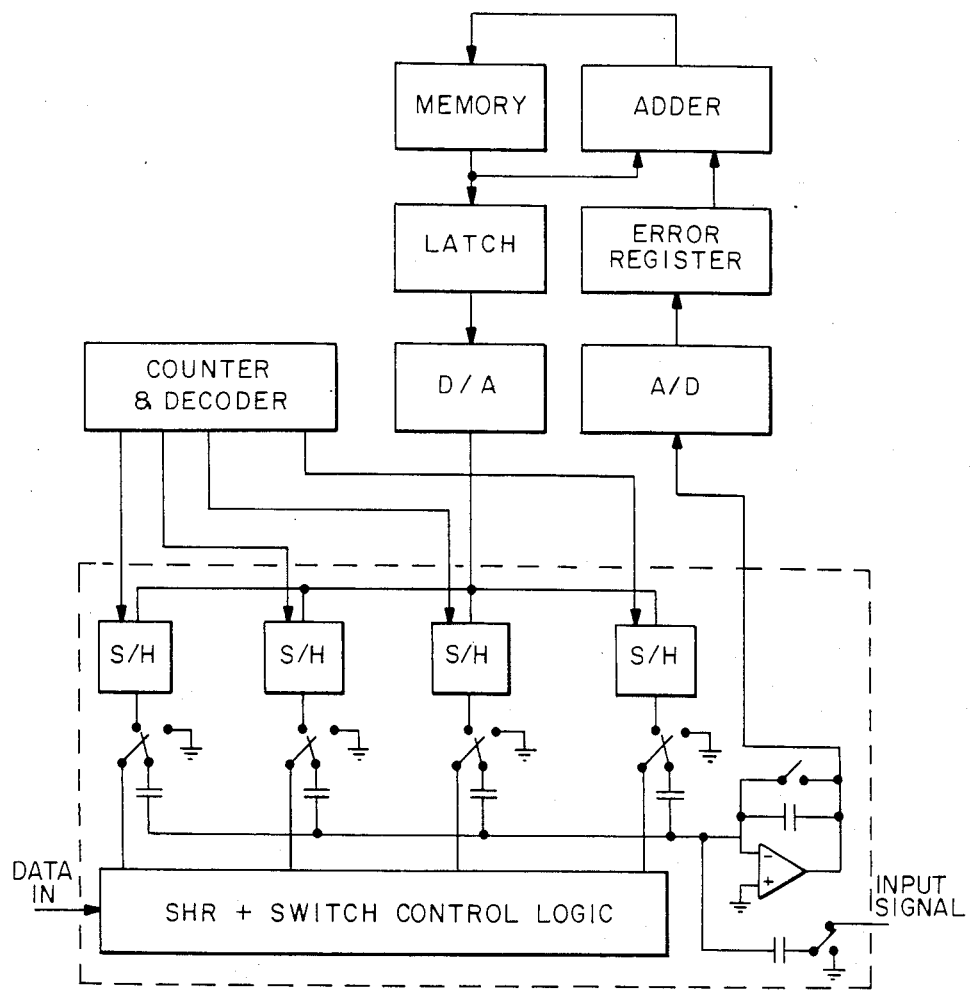
ECHO CANCELLER CONFIGURATION IN
WHICH THE D/A NONLINEARITY IS
COMPENSATED BY THE ADAPTATION
ALGORITHM
FIG. —3

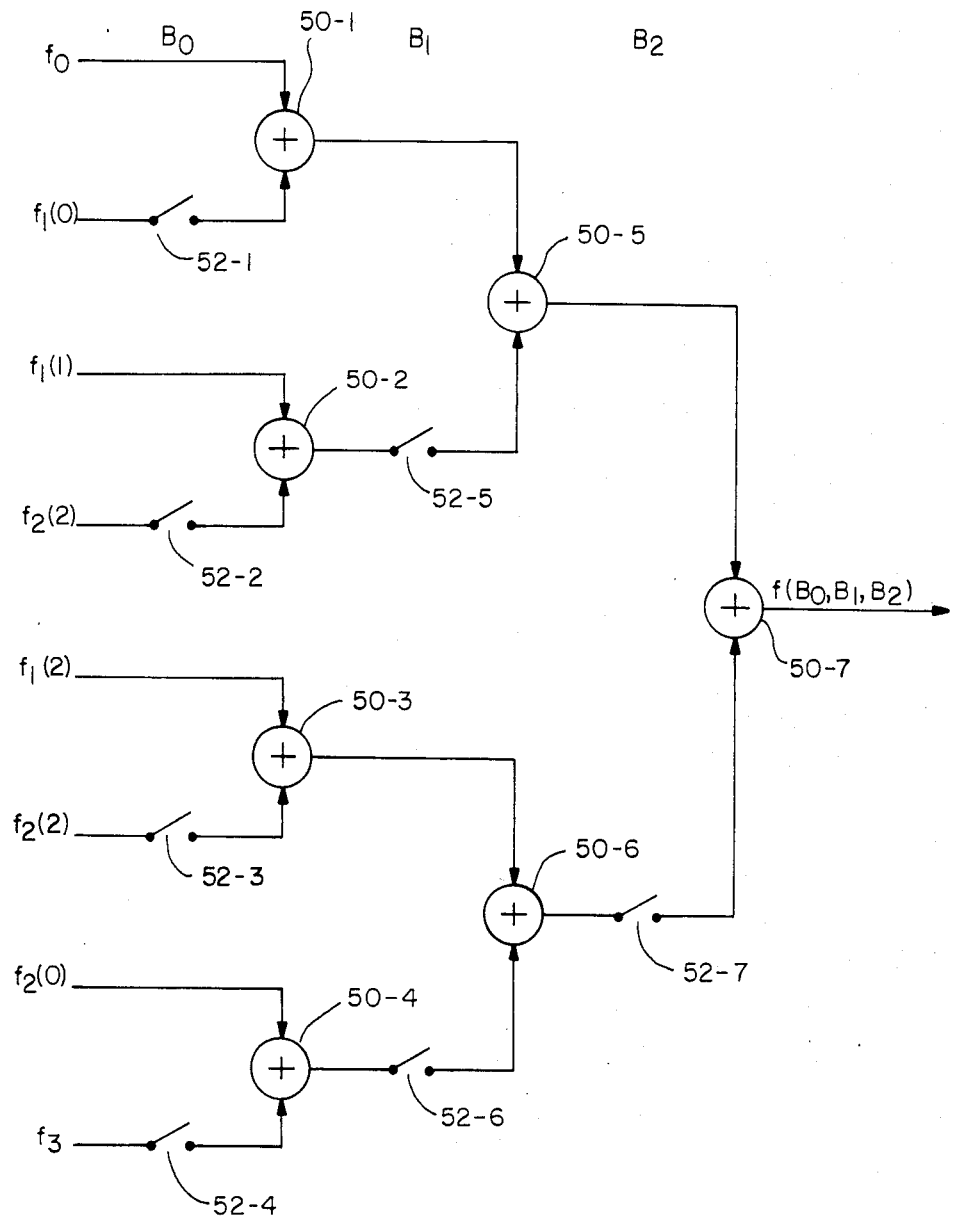
FIG.—4a

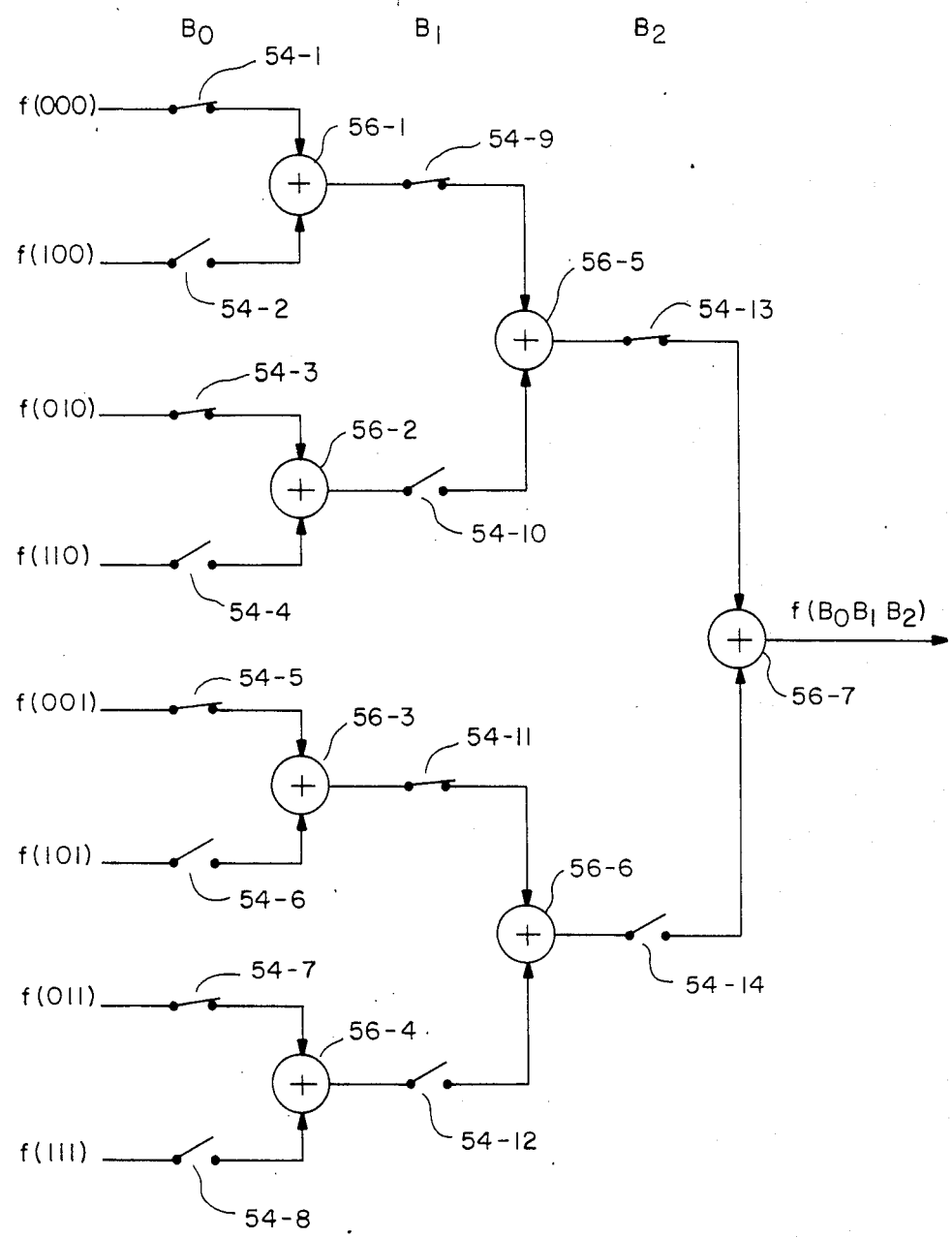
FIG.—4b

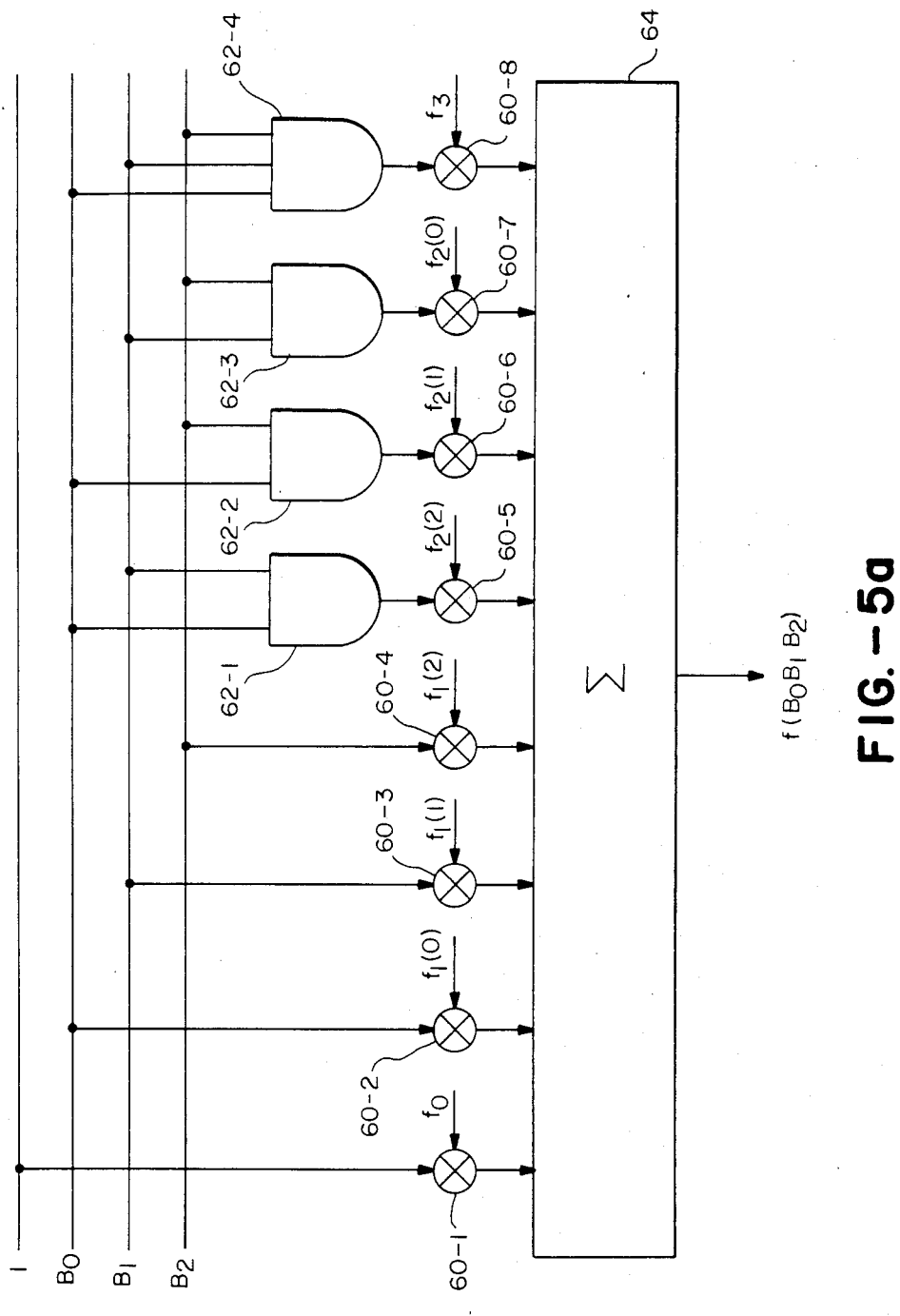
FIG.—5a

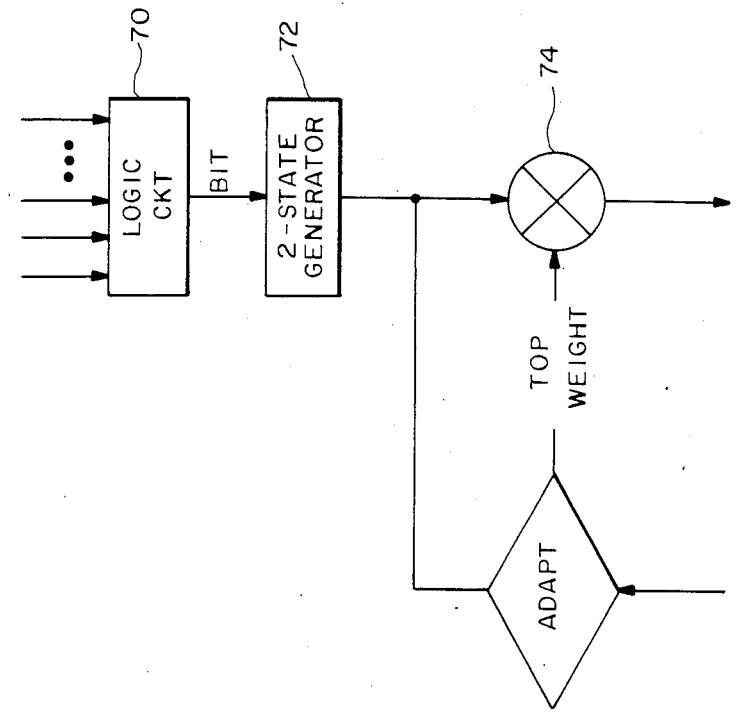
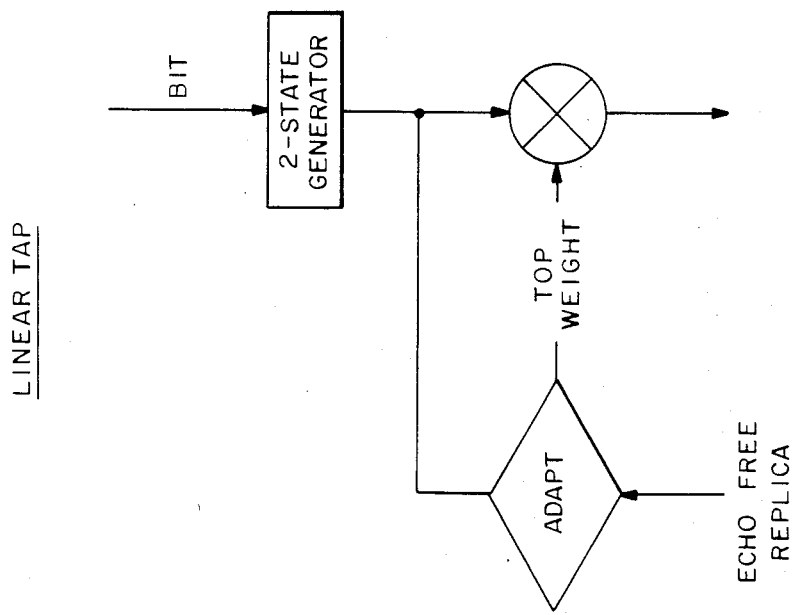
FIG.—5c

FIG.—8

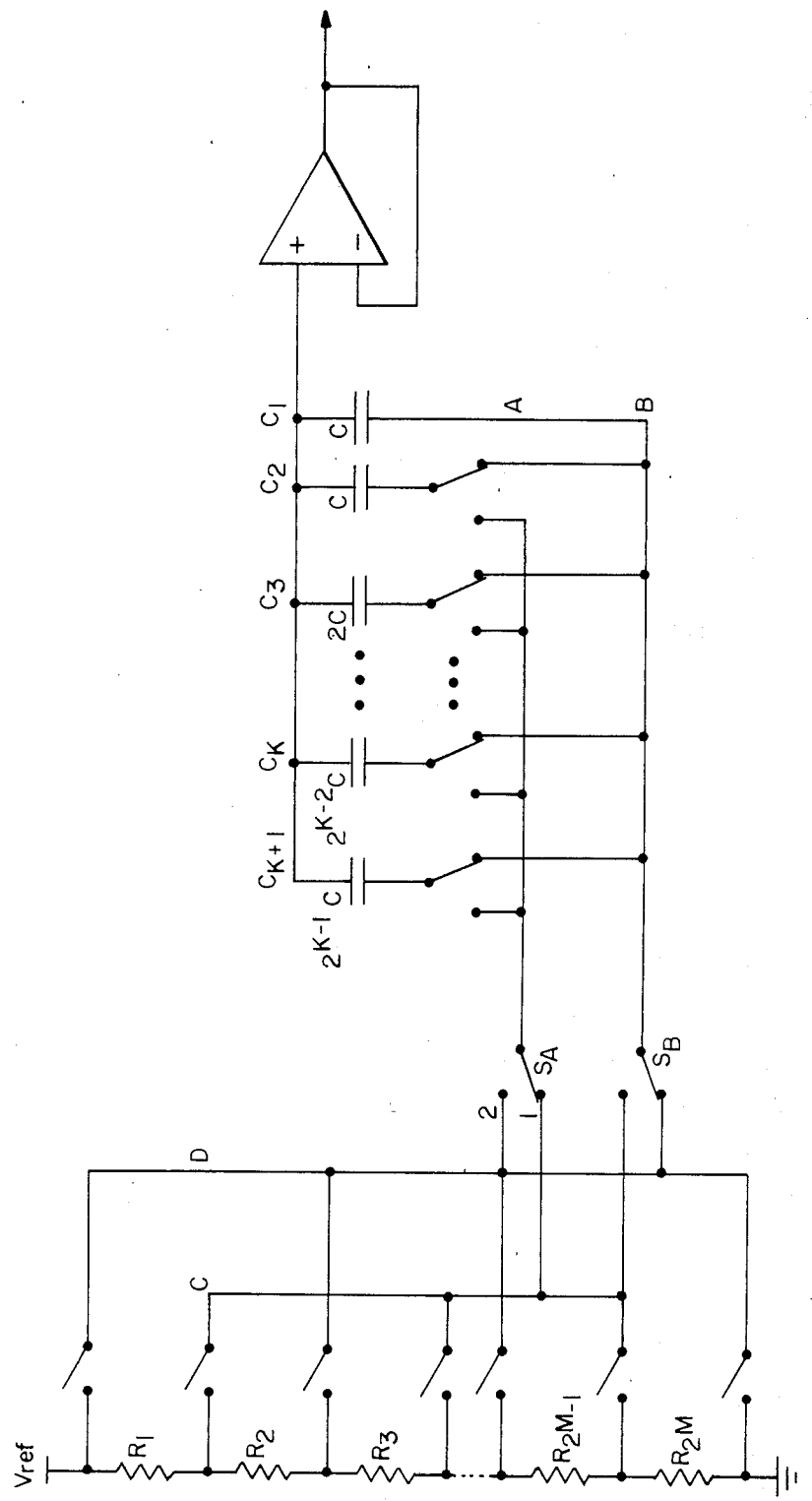
FIG.—10
DAC USING RESISTOR STRING AND CAPACITOR ARRAY
(SWITCH CONTROL IS EMITTED FOR SIMPLICITY)

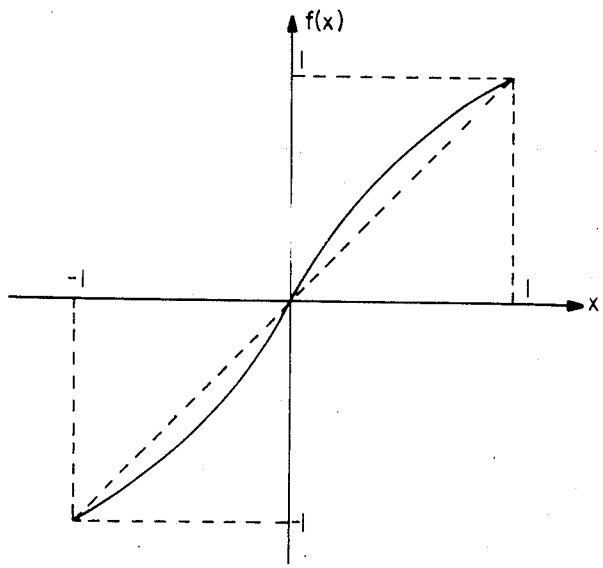
NONLINEAR FUNCTION $f(x) = 1.01333x - .01333x^3$
FIG. — 11a
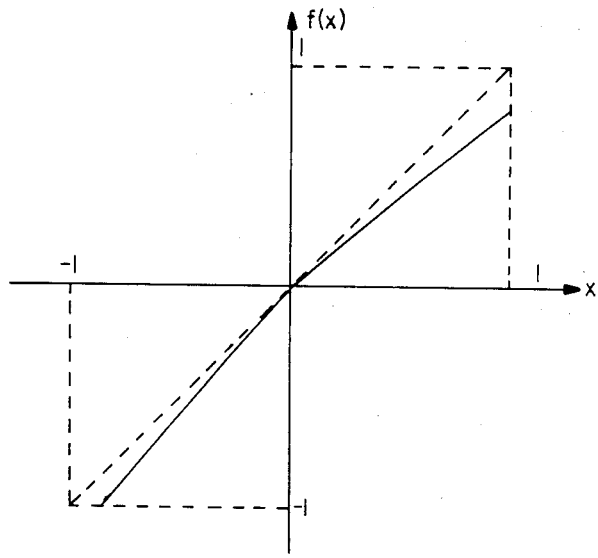
NONLINEAR FUNCTION $f(x) = x - .005|x|$
FIG. — 11b

NON-LINEAR ECHO CANCELLATION OF DATA SIGNALS

BACKGROUND OF THE INVENTION

The present invention relates to an echo cancellation circuit and method.

Data echo cancellers have received considerable attention in recent years in connection with digital subscriber loop modems and full-duplex voiceband data modems. With such modems, an inherent two-wire transmission facility is turned into an equivalent four-wire connection by using a hybrid circuit at each end. Data can then be transmitted simultaneously in both directions. However, the attenuation of the hybrid between its two four-wire inputs can be as low as approximately 10 dB. The purpose of an echo canceller is to remove the "near-end cross-talk" or "echo" signal which feeds through the hybrid into the local receiver, interfering with the data signal coming from a distant transmitter. Since the latter transmitted data signal may be highly attenuated (40 to 50 db), the required attenuation of the echo signal is consequently large (on the order to 50 to 60 db) in order to achieve an acceptable signal-to-echo interference ratio at the receiver input for the maximum expected line attenuation.

Most prior art echo canceller implementations completely neglect the effect of non-linear distortion in the echo path or in the echo replica. An exception to this uses an echo canceller with $2^N$ taps to synthesize an impulse response of N samples, as described in more detail in *IEEE Transactions on Communications,* Vol. COM-29, 11, Nov. 1981 entitled "A New Digital Echo Canceller for Two-Wire Subscriber Lines." In this canceller, called a "memory compensation" or "table lookup" canceller, the echo canceller assigns an independent output to each possible combination of N transmitted bits, and thus is completely general as to the kind of nonlinearity that it can correct. The price paid for this generality is $2^N$ taps rather than N, and requires a structure in which at each sample time only one tap weight can be updated. The consequences of this are that for large N the required memory becomes very large and the adaptation very slow.

Achieving a 50 to 60 dB cancellation in a monolithic echo canceller is further complicated by the inherent nonlinearities in monolithic A/D and D/A converters due to processing variations and component variations. These systems have to deal with small amounts of non-linear distortion, i.e., a channel which is "almost" linear. It would therefore be highly desirable to provide an improved echo cancellation circuit and method which can correct for small amounts of non-linear distortion without a large complexity penalty or adaptation speed penalty.

In view of the above background, it is an objective of the present invention to provide an improved echo cancellation circuit and method.

SUMMARY OF THE INVENTION

The present invention relates to an echo cancellation circuit and method for a full-duplex data transmission system, such as in digital subscriber loop modems and voiceband data modems.

In one embodiment, the invention comprises a linear echo cancellation circuit connected to receive an echo signal having both linear and non-linear components. The circuit includes N-linear tap weights for cancelling the linear components of the echo signal and M total taps, including M-N non-linear tap weights for cancelling the non-linear components of the echo signal. The number of non-linear taps (M-N) which are added depends on the degree of non-linearity which must be compensated. In a preferred embodiment, M is greater than or equal to N, but less than or equal to $2^N$.

The echo canceller can operate in spite of non-linearities in the echo channel or in the implementation of the echo canceller itself, such as with digital to analog converters. These non-linearities must be time-invariant or slowly time-varying, but need not be memoryless.

The improved echo canceller can be implemented by a relatively small number of taps added to a linear echo canceller (e.g., $M \simeq 2N$), with substantial improvement in the cancellation results.

In accordance with the foregoing summary, the present invention achieves the objective of providing an improved echo cancellation circuit and method.

Other objects and features of the present invention will become apparent from the following detailed description when taken in conjunction with the accompanying drawings.

BRIEF DESCRIPTION OF THE DRAWINGS

FIG. 2 depicts alternative echo canceller configurations, in which FIG. 2a depicts a fully digital echo canceller and FIG. 2b depicts a digital transversal filter and analog concancellation.

FIG. 3 depicts an echo canceller configuration in which the D/A non-linearity is compensated by an adaption algorithm.

FIG. 4 depicts a binary tree representation of non-linear function in which FIG. 4a is a binary series expansion and FIG. 4b is a table lookup method.

FIG. 5 depicts a hardware implementation of non-linear function, in which FIG. 5a is a binary series expansion.

FIG. 10 depicts a digital to analog converter (DAC) using resistor string and capacitor array.

FIG. 11 depicts typical DAC transfer functions (a) $f(x) = 1.01333x - 0.01333x^3$ (b) $f(x) = x - 0.005/x/$.

DETAILED DESCRIPTION OF THE DRAWINGS

1. Introduction

Figure 1:
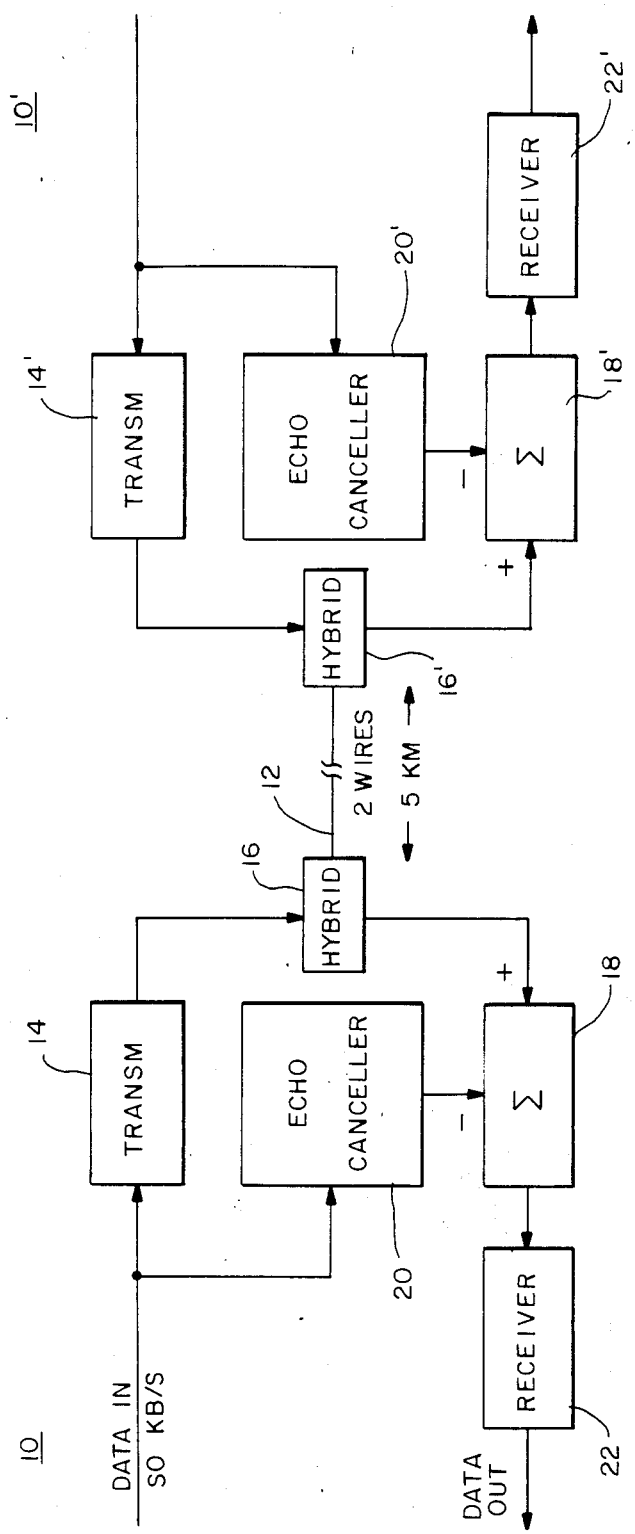
FIG. 1 depicts subscriber loop modems communicating on two wires.

Referring now to the drawings, FIG. 1 depicts subscriber loop modems 10,10' communicating on two wires 12. Proper echo cancellation techniques ensure full duplex transmission with adequate channel separation. Each modem circuit 10,10′ of FIG. 1 includes a transmitter 14, a hybrid circuit 16, echo canceller circuit 20, summing circuit 18, and receiver 22. As will be described in more detail, each echo cancellation circuit 20 includes means to receive a first bit stream corresponding to a first transmitted data signal transmitted via transmitter 14 and hybrid circuit 16 over wires 12. Canceller 20 also includes means to receive a second transmitted data signal over wire 12. The second data signal includes an echo portion of the first bit stream having both linear and non-linear components.

The canceller 20 includes means for processing the first bit stream to generate a replica of the echo signal portion of the second data signal.

The canceller 20 includes means 18 for subtracting the echo replica from the second data signal to yield an echo-free (or substantially echo-free) replica of the second data signal.

As an example of the kinds of nonlinearity appearing in a practical system, consider the subscriber loop modem shown in FIG. 1. The following sources of nonlinear distortion can be identified:

A. Transmitted pulse symmetry.

When nominally balanced positive and negative pulses are transmitted, in practice there will be a slight imbalance which cannot be compensated for by a linear echo canceller. To achieve 50 dB or more of echo cancellation, a linear echo canceller would require that the uncompensated transmitted pulse symmetry be kept below some $-60$ dB, which can be achieved with careful circuit design at the cost of increased complexity.

B. Saturation in transformers.

This will lead to a slight nonlinearity which can be controlled by choice of a bulkier transformer.

C. Nonlinearity of data converters.

The echo canceller is typically implemented as a digital processor, since its input consists of an inherently digital bit stream. This suggests that the actual cancellation be done digitally, requiring A/D (analog to digital) conversion of the received signal (containing the echo), or the cancellation can be done in analog, requiring D/A (digital to analog) conversion of the canceller output. These data converters constitute the most important source of nonlinearity, particularly where monolithic converters without trimming are to be employed.

Examining the alternatives in the use of data converters in greater detail, FIG. 2 shows two possible configurations. In FIG. 2a, a purely digital echo canceller, using a front end A/D 34, is considered. S/H circuit 32 samples the second data signal at regular intervals and A/D 34 converts it to a digital format. For a digital subscriber loop with a bit rate of 80 kb/s and a minimum of 50 dB of echo cancellation, the A/D 34 needs a resolution of 12 or more bits with ½ LSB (least significant bit) integral linearity and a conversion time of 6 microseconds or less. Digital adaptive transversal circuit 30 generates a digital representation of the echo portion of the second data signal and digital circuit 36 provides means for subtracting the digital representation from the converted second data signal.

In FIG. 2b, the output of the echo canceller is converted to analog and the cancellation is performed in the analog domain. Digital adaptive transversal filter 40 provides means for generating a digital representation of the signal and echo signal and D/A converter 46 provides means for converting the digital signal to an analog representation or format. Analog circuit 44 provides means for subtracting the analog echo replica from the received data signal. The error signal needed by the digital processor echo canceller is converted to digital by a lower resolution (possibly only one bit) A/D converter. The required resolution is at least 12 bits with ½ LSB integral linearity in the D/A and as many as 8 bits in the A/D (which should be monotonic but not necessarily linear). The problem of the linearity of the data converters is a very important one in the context of an MOS (metal-oxide-semiconductor) monolithic implementation of these modems. Specifically, the configuration of FIG. 2b is particularly attractive, since D/A converters such as converter 46 of the required speed and resolution have already been demonstrated in MOS technology. However, the linearity requirements can only be achieved using self-correction or trimming, which are costly solutions. An alternative solution to the problem in which the transversal filter summation is done by analog circuitry and thus the adaptation can compensate for the D/A nonlinearity is shown in FIG. 3 and has also been demonstrated. (Details of the above are described in more detail in the cross-referenced application entitled "Echo Canceller Tolerant of Non-Linear Elements", Ser. No. 414,515, filed Sept. 2, 1982.) However, that solution cannot correct other sources of distortion, like pulse asymmetry or saturation in transformers. Furthermore, digital circuits benefit more from the shrinking design rules and are easier to design than their analog counterparts, and thus a technique amenable to digital implementation like the one presented here is likely to be preferred in the future.

The technique described here is also interesting in other respects. It leads to a systematic design procedure for using a binary transversal filter (where the delays are implemented by shift registers) even in the context of a multilevel transmitted signal and line codes with memory. The multilevel signal could have states "1" or "0", or states "+1" or "−1", or any other logical variation including three or more states. The design procedure can also take advantage of redundancies in the transmitted line code in the form of simplification of the echo canceller hardware. The technique is also applicable to the implementation of the decision feedback equalizer feedback filter, which has a structure very similar to that of the echo canceller, although the requirements on this filter are relatively relaxed and compensation for nonlinearities may not be required.

In Section 2, a method of expanding an arbitrary nonlinear function of a number of bits in a series with a finite number of terms is presented. This expansion serves as the basis for the nonlinear echo canceller design procedures described later. Then in Section 3 the application of this expansion to multilevel transmitted signals, redundancies in the line code, and nonlinearities in the echo channel and the canceller itself are considered. Section 4 gives simulation results for the types of nonlinearities typically encountered in MOS D/A converters. These results indicate that, depending on the number of bits in the D/A converter, a 20 dB or greater increase in echo attenuation can be obtained by incorporating compensation for the D/A nonlinearity with a modest increase in canceller complexity.

2. A Binary Series Expansion of a Nonlinear Function

Let $f(B_0, \ldots, B_{N-1})$ be an arbitrary (nonlinear) function of N bits, where $B_i$ assumes one of the values 0 or 1. Over all combinations of N bits this function assumes a total of $2^N$ possible values (which are not necessarily distinct). It is now shown that this function can be represented as a series with a finite number of terms, $$f(B_0, \ldots, B_{N-1}) = f_0 + \sum_{k=0}^{N-1} f_1(k)B_k + \quad (2.1)$$

$$\sum_{k_1 \neq k_2} f_2(k_1,k_2)B_{k_1}B_{k_2} + \ldots +$$

$$\sum_{k_1 \neq k_2 = \ldots = k_L} f_L(k_1,k_2,\ldots,k_L)B_{k_1}B_{k_2}\ldots B_{k_L} + \ldots +$$

$$\sum_{k=0}^{N-1} f_{N-1}(k)B_0B_1\ldots B_{k-1}B_{k+1}\ldots B_{N-1} +$$

$$f_N B_0 B_1 \ldots B_{N-1}.$$

The general L-th order sum is over all combinations of L of the N indexes. Thus, for example, in the second order term, $B_1B_2$ only appears once, and not as a separate $B_2B_1$ term. To reduce the number of arguments, the subscripts of the missing bits have been used as arguments of the last N/2 coefficients $f_r(\cdot)$. The total number of terms can be obtained by observing the number of combinations of N bits taken L at a time is $$\begin{bmatrix} N \\ L \end{bmatrix}.$$

Thus, the total number of terms in the representation is $$\sum_{L=0}^{N} \begin{bmatrix} N \\ L \end{bmatrix} = 2^N. \quad (2.2)$$

The proof that the expansion of (2.1) in general is simple by induction. Note first that $$f_0 = f(000\ldots0). \quad (2.3)$$

the function evaluated for all zeros, since all the higher order terms are zero. Then, evaluating the function for a single 1 in the argument at position k, all the second and higher order terms are zero and $$f_1(k) = f(00\ldots010\ldots0) - f_0. \quad (2.4)$$

where the single 1 is in position k. Similarly, when the function is evaluated for two ones in positions $k_1$ and $k_2$, all the third and higher order terms are zero and $$f_2(k_1k_2) = f(0\ldots010\ldots010\ldots\\ 0) - f_1(k_1) - f_1(k_2) - f_0. \quad (2.5)$$

Proceeding by induction, all the constants in the expansion can be evaluated. Not only does this prove the result, but it also elaborates a procedure by which the constants of the expansion can actually be evaluated for a given function of N bits.

Understanding of this expansion can perhaps be enhanced by a simple example. For a function of three bits $f(B_0,B_1B_2)$ the expansion becomes $$f(B_0,B_1,B_2) = f_0 + f_1(0)B_0 + f_1(1)B_1 + f_1(2)B_2 + \quad (2.6)$$

$$f_2(2)B_0B_1 + f_2(1)B_0B_2 + f_2(0)B_1B_2 + f_3B_0B_1B_2$$

where there are $2^3 = 8$ terms total. Interestingly, this expansion can be written in the form $$f(B_0,B_1,B_2) = f_0 + f_1(0)B_0 + B_1(f_1(1) + f_2(2)B_0) + \quad (2.7)$$

$$B_2(f_1(2) + f_2(1)B_0) + B_1(f_2(0) + f_3B_0)),$$

a form which generalizes to the general case of N bits. This latter form results in a tree of switches 52 and adders 50 as shown in FIG. 4a. The leaves of the tree are the values of the constants in the expansion, and the switches 52 closest to the leaves are closed when $B_0=1$ and are open when $B_0=0$, and similarly for the switches 50 in the other two levels of the tree. Note that in general a number of constants in the expansion contribute to the value of the function, from a minimum of one for the all-zeros case to a maximum of eight for the all-ones case. A number of summations have to be evaluated to determine the function, from a minimum of zero in the all-zeros case to a maximum of seven in the all-ones case.

An alternate representation for the function, also requiring eight constants, is shown in FIG. 4b. This tree also has three levels (or in general N levels for N bits) but in this case every branch has a switch 54. The convention is that the switches 54 are shown for the $B=0$ condition, and reverse for the $B=1$ condition. In FIG. 4b, when the function is evaluated, one and only one path through the tree has all the switches 54 closed. Thus, only one of the constants contribute to the function evaluation, and no summations are actually required. This method is of course simply a table look-up, in which the eight functional values are stored.

It might be asked what value the expansion of FIG. 4a has when it requires the storage of eight constants, the same as for the method of FIG. 4b but, unlike FIG. 4b, also requires summations. The answer is that in many practical situations not all of the terms in the series expansion need be retained. For example, if the function is "linear", then $$f(B_0,B_1,B_2) = f_1(0)B_c + f_1(1)B_1 + f_1(2)B_2 \quad (2.8)$$

and only three terms of the expansion of FIG. 4a need to be retained while all eight terms of the expansion of FIG. 4b are always required. This is of considerable importance when N is large and the function is linear or nearly linear. This utility will be demonstrated in Sections 3 and 4 for the application to echo cancellation of data streams.

Figure 5B:
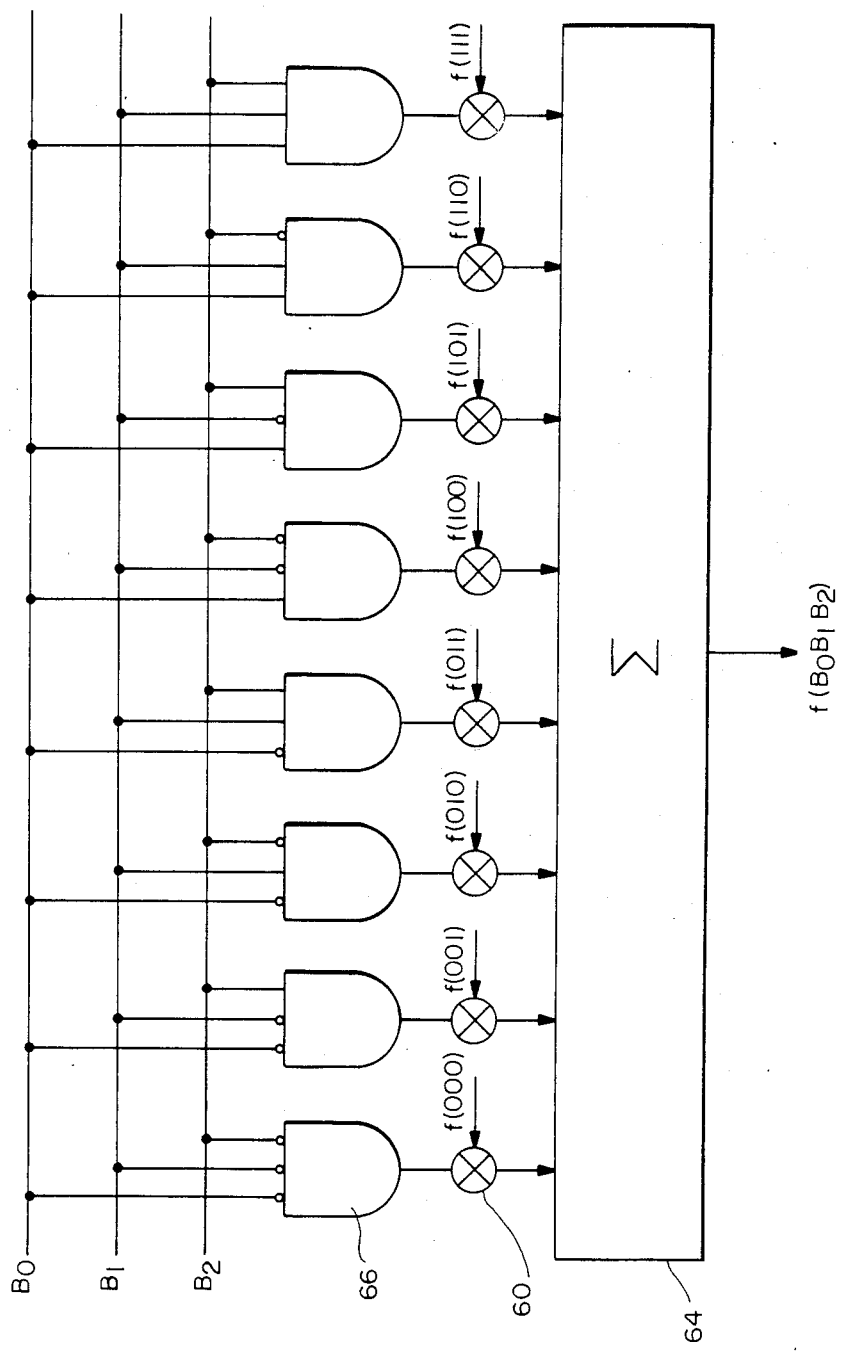
FIG. 5b is a table lookup method, and FIG. 5c are linear and non-linear taps.

Representations of these two methods in a form more appropriate for hardware realization are shown in FIG. 5. This figure assumes that the bits $B_k$ represent two states "0" and "1". In FIG. 5a, there are N linear multipliers 60-2, 60-3, 60-4 for multiplying the N tap weights $f_1(0), f_1(1), f_1(2)$ with the N bits $B_0, B_1, B_2$. In FIG. 5a, note that the products of bits $B_0, B_1,$ and $B_2$ are easily generated using "AND" gates 62. The logical function illustrated by AND gates 62 could be performed by other logic circuits, such as an exclusive-OR function, or any other type of logical circuits for different representations of the two states (as for example "1" and "−1"). There are M-N multipliers 60-1, 60-5, 60-6, 60-7 and 60-8 for multiplying the tap weights $f_0, f_2(2), f_2(1), f_2(0)$ and $f_3$ with a logical "1" or nonlinear logical combinations of two or more of the bits $B_0, B_1,$ or $B_2$. Summing circuit 64 performs the summing function to form the output signal $f(B_0,B_1,B_2)$. While the representation of FIG. 5b for the table look-up method is not necessarily practical (simply storing the values in a RAM or ROM is more reasonable), this form is conceptually valuable when the adaptive filtering application is considered in the next Section. FIG. 5c depicts in more detail the circuitry needed to implement one of the linear or nonlinear taps in FIG. 5a. It specifically shows the circuitry which converts from a logical "0" or "1" representation to a two-state representation which can assume any of a multitude of pairs of values (for example "−1" and "+1").

In the case of a linear tap, the single input bit is converted into a two-state representation (for example "+1" and "−1") by the two-state generator 72. This is then multiplied by the tap weight value in multiplier 74.

One skilled in the art will recognize that if the values at the output of 72 are simply "+1" or "−1", that a true hardware multiplier is not required, but rather whether the output of 72 is added or subtracted in the summation 64 of FIG. 5a can simply be controlled. In the case of the nonlinear tap, there is an added logic circuit 70 which has at its input two or more logical signals and at its output a single logical signal.

For example, if the two states are "0" or "1", then 70 simply performs a logical AND of the input logical signals, and if the two states are "−1" and +1" then it performs a logical "exclusive-or", in each case in effect multiplying the corresponding two-state representations of the input logical signals. Also shown in FIG. 5c is an adaptation circuit not shown in FIG. 5a which provides means for adapting the tap weights to minimize the size of the residual echo at the output of the subtraction circuit 18 in FIG. 1. This adaptation circuit responds to the output of the two-state circuit 72 as well as the residual echo signal at the output of the substraction circuit 18 in FIG. 1 in a manner to be described in conjunction with FIG. 9.

2.1 Expansion of Incompletely Specified Functions

When the function $f(B_0, \ldots, B_{N-1})$ is not specified for some particular N-bit sequences, a corresponding reduction in the number of terms in the expansion of (2.1) can be obtained. An application of this fact is given in Section 3.1.

Suppose that the function is specified for $M < 2^N$ values of its arguments. Then no more than M terms in the expansion are required. To see this, the procedure to determine the expansion coefficients can be modified as follows. When the procedure reaches one of the N-bit sequences for which the value of the function is not specified, the value of the expansion is a "don't care" for this particular argument. Therefore, the expansion coefficient being determined can be set to any arbitrary value. In particular, a value of zero effectively eliminates one of the terms of the expansion. Setting to zero the coefficients of all the terms corresponding to bit patterns for which the function is not specified results in precisely $(2^N - M)$ zero coefficients, leaving a maximum of M non-zero coefficients. A natural application is to obtain an expansion such as (2.1) for a function f(C) where C assumes one of the M values. Then for N chosen such that $2^N \geq M$, M different N-bit sequences can be assigned to each of the M values of C. An expansion of the form of (2.1) with a maximum of M terms then results. This procedure will be illustrated in Section 3.1 for a multilevel transmission application.

2.2 Expansion in Terms of Other Binary Variables

In some applications, it is desirable to obtain an expansion of the form of (2.1) in a set of variables which each assume two values, like $B_k$ but not the particular values 0 and 1. For example, in data transmission, it is common to transmit levels 1 and −1 rather than 0 and 1. The former values have the advantage, as will be seen later, of having statistical properties which are easier to handle.

Let the variable $C_k$ assume one of two values. Then it follows from (2.1) that $$C_k = a + bB_k \qquad (2.9)$$

where $B_k$ assumes the values 0 and 1 and a and b are some appropriately chosen constants. It is shown below that an expansion of the form of (2.1) can be obtained with $B_k$ replaced by $C_k$, $0 \leq k \leq N-1$. Further, a procedure is given which enables one to determine the coefficients of this expansion starting from the coefficients of (2.1).

The determination of the coefficients of the expansion is easily done as in Section 2.0 in terms of the $B_k$ which assume the values 0 and 1. However, it is of interest to transform the expansion to be in terms of a new variable $C_k$, which assumes two different values. Substituting (2.9) directly into (2.1) results in an inordinate number of cross-terms, and is probably intractable. However, the new expansion can be determined as follows: Consider just the terms in (2.1) which contain $B_0$; there are precisely $2^{N-1}$ of them. Factoring $B_0$ out of these terms, the decomposition as set forth below is:

$$f(B_0, B_1, \ldots, B_{N-1}) = f_1(B_1, \ldots, B_{N-1}) + B_0 f_2(B_1, \ldots, B_{N-1}) \qquad (2.10)$$

where $f_1$ and $f_2$ are each expansions identical in form with $2^{N-1}$ terms. Substituting for $B_0$ in terms of $C_0$, $$f(C_0, B_1, \ldots, B_{N-1}) = f'_1(B_1, \ldots, B_{N-1}) + C_0 f'_2(B_1, \ldots, B_{N-1}) \qquad (2.11)$$

where $$f'_1(B_1, \ldots, B_{N-1}) = f_1(B_1, \ldots, B_{N-1}) - \frac{a}{b} f_2(B_1, \ldots, B_{N-1}) \qquad (2.12)$$

and $$f'_2(B_1, \ldots, B_{N-1}) = \frac{1}{b} f_2(B_1, \ldots, B_{N-1}). \qquad (2.13)$$

Once all the terms of these two partial expansions have been determined as in 2.12 and 2.13, the two partial expansions can be combined to form a single expansion for $f(C_0, B_1, \ldots, B_{N-1})$. When this procedure is repeated for $B_1$ through $B_{N-1}$, the expansion $f(C_0, C_1, \ldots, C_{N-1})$ is complete.

3. Application to Echo Cancellation

The usual assumption in the design of an echo canceller for data transmission is that the echo signal consists of a linear superposition of N data symbols, $$e_k = \sum_{j=0}^{N-1} C_{k-j} h_j \qquad (3.1)$$

where $e_k$ is the current echo signal, $C_k$ is the current transmitted data symbol, assuming one of M possible values (M-ary transmission), and $h_0, \ldots, h_{N-1}$ are the impulse response samples of the echo channel. In this Section, the linearity is relaxed and it is shown how nonlinearities in the echo channel and in the echo canceller itself can be compensated in the canceller using the series expansion of (2.1). It will be shown that this method is considerably more attractive than the table look-up method, particularly when the number of bits N is large and the nonlinearities are mild.

In Section 3.1 the application of this expansion to multilevel data transmission will be discussed. Then in Section 3.2 the application to a nonlinear channel and/or a canceller which for implementation reasons is nonlinear will be explored. Section 3.3 explores the modifications which are desirable when typical line codes are employed. Section 3.4 derives an adaptive algorithm which can be used to "learn" the characteristics of the nonlinear channel and the nonlinearity of the canceller itself (this adaptation algorithm turns out to be essentially the same as for a linear canceller). Section 3.5 considers the truncation of expansion (2.1) to a relatively small number of terms, and describes a procedure for determining which terms to retain. Finally, Section 4 will give numerical results based on computer simulations for reasonable channel and canceller models to illustrate the viability of the techniques.

3.1 Multilevel Transmitted Signals With Linear Canceller

It has been pointed out in the prior art (i.e., see *IEEE Transactions on Communications,* Vol. COM-24, 9, September 1976, pp. 956-962, entitled "A New Digital Echo Canceller for Two-Wire Full Duplex Data Transmission") that an echo canceller for data transmission is particularly attractive to implement when the transmitted data bits are input directly to the canceller, resulting in a "binary transversal filter" in which the delay elements store individual bits rather than analog values and the need for multiples is eliminated. When the transmitted data symbols are multilevel, as is usually the case for example in voiceband data transmission, then this advantage would seem to be partially negated. For M transmitted levels, the transversal filters require the storage of M values at each stage and multiplies the tap weights by one of the transmitted data levels. For certain signal constellations, the latter values can be particularly inconvenient, as for example the square root of two.

In the instance of multilevel data the expansion (2.1) can be used to obtain a simpler implementation. Let L be an integer such that $2^L \geq M$. The transmitted level $C_k$ can be represented as a function of L bits, $$C_k = f(B_{1,k}, B_{2,k}, \ldots, B_{L,k}) \tag{3.2}$$

which in turn can be expanded as in (2.1). As shown in Section 2.1, at most M terms are required in this expansion.

This result will now be illustrated for M=2 through M=5. For M=2 level transmission, L=1 and (2.1) becomes $$C_k = a + bB_{1,k} \tag{3.3}$$

for some constants a and b. Section 2 gives a procedure for finding the two constants, but in this case it is not necessary to find them since, as will be shown shortly, the adaptation of an adaptive canceller will automatically find the right constants without need for the designer to specify them.

For a three-level transmitted signal, let L=2 and assign the bit patterns 00, 01, and 10 to the three levels. Then in the expansion of (2.1) the term corresponding to the 11 bit pattern, which is $f_2$, can be set to zero, resulting in an expansion of the form $$C_k = a + bB_{1,k} + cB_{2,k} \tag{3.4}$$

where there are three constants. Alternatively, if the bit pattern 01 is not assigned, then the $f_1(2)$ coefficient can be set to zero and $$C_k = a + bB_{1,k} + cB_{1,k}B_{2,k} \tag{3.5}$$

which is of a slightly different form but still has three constants. Similarly, there are two other possibilities for the expansion, corresponding to not assigning the 00 or 10 bit patterns.

When the number of transmitted levels is four, the expansion of (2.1) becomes directly of the form $$C_k = a + bB_{1,k} + cB_{2,k} + dB_{1,k}B_{2,k} \tag{3.6}$$

for some constants (a,b,c,d). Finally, for M=5, choose L=3 and assign the bit patterns 000, 001, 010, 100, and 011 to the five levels. Then the expansion is of the form $$C_k = a + bB_{1,k} + cB_{2,k} + dB_{3,k} + eB_{2,k}B_{3,k} \tag{3.7}$$

where there are in this case 55 other ways in which the five levels can be assigned to patterns of three bits, each resulting in a different form of the expansion.

It should be emphasized that in any of these illustrative expansions one or more of the constants can be zero. In fact, one criterion is the number of non-zero terms which result for the particular transmitted levels.

Figure 6:
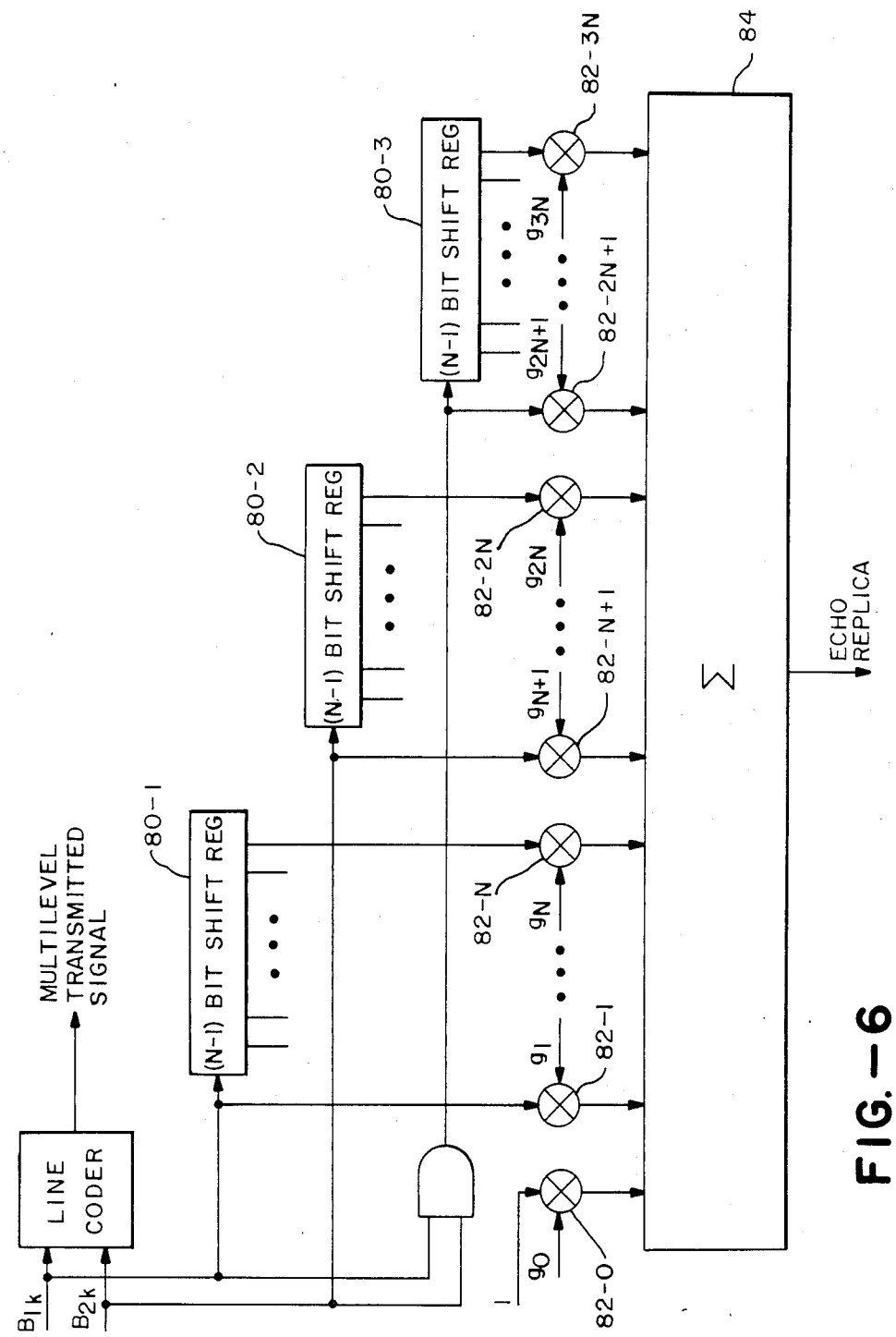
FIG. 6 depicts a linear echo canceller for multilevel transmitted signals.

Using these expansions, the received echo signal of (3.1) can be represented in a different form, in which the terms are represented in terms of binary rather than M-level data signals. For example, for the four-level signal of (3.6), (3.1) becomes $$e_k = \sum_{j=0}^{N-1} h_j(a + bB_{1,k-j} + cB_{2,k-j} + dB_{1,k-j}B_{2,k-j}), \tag{3.8}$$

a representation of which is shown in FIG. 6. The echo response is represented as a transversal filter with 3N+1 taps, each of which needs to store only a single bit. The delay line can thus be implemented by a shift register 80 as i the binary transmission case, and the tap-weights do not require multiplies. The equivalent echo impulse response $(g_0, \ldots, g_{N+1})$ is a function of the actual channel impulse response as well as the constants (a,b,c,d). If an adaptive echo canceller is constructed from the model of FIG. 6, there is no need to explicitly incorporate these latter constants into the design, since the adaptation mechanism will automatically incorporate them. This should become clearer in Section 3.5 where adaptive filtering in the context of the expansion (2.1) will be elaborated.

When the transmission is two-level, then only one of the three shift registers 80-1, 80-2, 80-3 is required, so that there are N−1 total taps. For three-level transmission, only two of the shift registers 80-1, 80-2, 80-3 are required, so that there are 2N+1 total taps.

In general, for M-level transmission, the structure of a multiply-free binary transversal filter can be retained and the details of the multiple level transmitted signal can be left to the adaptation mechanism to sort out. In each case, a maximum of (M−1)N+1 taps are required in the binary transversal filter. This technique has two advantages. First, the implementation is simplified by incorporating the details of the multilevel signal into the tap weights. Second, in practice there will be some uncertainty in the transmitted levels due to component tolerances, etc., for which the canceller will automatically compensate. For example, a mismatch between a positive and negative transmitted level will have no adverse effect on the echo attenuation which can be achieved.

It should be emphasized that FIG. 6 pertains only to a linear echo signal. By the addition of nonlinear tops as described in Section 3.2, it can be easily modified for a nonlinear echo with multilevel transmitter signal.

3.2 Nonlinear Channel with Nonlinear Canceller

An interesting application of the expansion of Section 2 is to the compensation of nonlinear as well as linear effects in the channel, as well as in the canceller itself. The method by which this can be done will be considered in this Section.

Assume that the echo signal is not a linear superposition of data digits as in (3.1), bur rather that the echo is a general nonlinear function of the current and past $N-1$ data digits, $$e_k = f(C_k, C_{k-1}, \ldots, C_{k-N+1}). \tag{3.9}$$

This model precludes the possibility of the function f being a function of k, and thus requires that the nonlinear echo channel be time-invariant. However, when the canceller is made adaptive as in Section 3.5, the canceller can compensate for a nonlinear echo channel which is a slowly varying function of time.

Further assume for simplicity that the data digits are binary, assuming one of two values. As was mentioned in Section 2.2, the expansion of (2.1) is valid for an arbitrary two-level signal $C_k$ as well as for a signal $B_k$ which assumes the values 0 and 1. It is convenient to write this expansion in a vector inner product notation. Toward this end, define a $2^N$-dimensional "augmented transmitted data vector"

$$c_k = (1, C_k, \ldots, C_{k-N+1}, C_k C_{k-1}, C_k C_{k-2}, \ldots, \tag{3.10}$$
$$C_{k-N+2} C_{k-N+1}, \ldots, C_k C_{k-1} \ldots C_{k-N+1})^T$$

where each term in the series representation of (2.1) is represented and the superscript T denotes transpose. The subscript k on $c_k$ reflects the fact that this vector is changing with time in accordance with the current and last $N-1$ bits of the data sequence.

In a similar way, deine a $2^N$-dimensional "augmented echo path vector"

$$g = (g_0, g_1(0), g_1(1), \ldots, g_1(N-1), g_2(0,1), \ldots,$$
$$g_2(N-2, N-1)) \tag{3.11}$$

which is a vector of coefficients of an expansion of the form (2.1) and in accordance with (3.9) is not a function of k. Then a more compact notation for expansion (2.1) is as an inner product of an augmented data vector with the augmented echo path vector $$e_k = c_k^T \cdot g. \tag{3.12}$$

Figure 7:
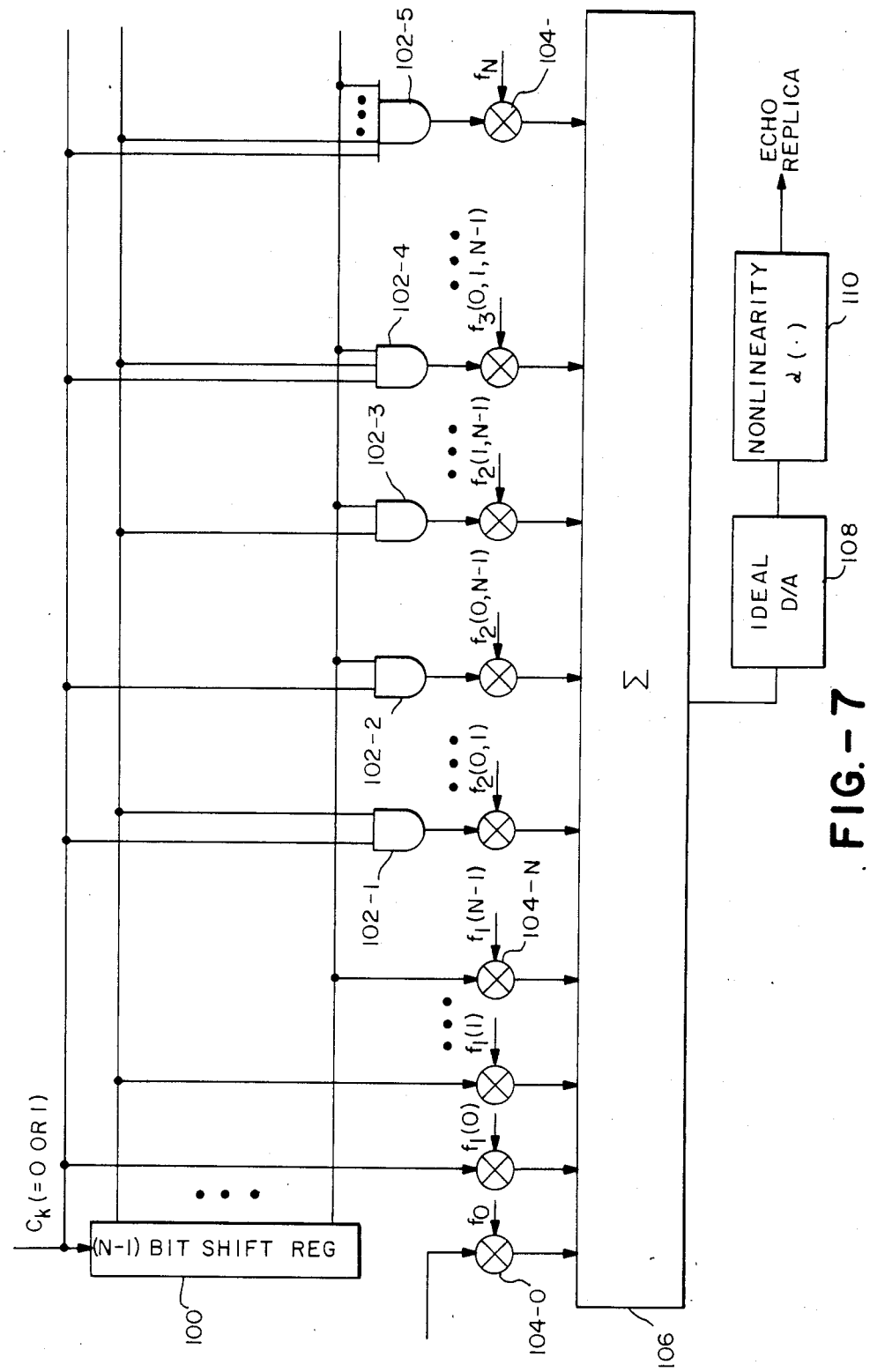
FIG. 7 depicts a non-linear echo canceller for non-linear channel in which distortion introduced by the channel and by the D/A non-linearity d(·) are both compensated.

It is natural to assume that the canceller implements an expansion of the form of (3.12) with tap vector a $$a = (a_0, a_1(0), a_1(1), \ldots, a_1(N-1), a_2(0,1), \ldots,$$
$$a_2(N-2, N-1), \ldots, a_N) \tag{3.13}$$

so that an arbitrary nonlinear echo can be exactly cancelled. A hardware realization of this canceller is shown in FIG. 7 for the case where $C_k$ assumes the values of 0 and 1. The AND gates 102, multipliers 104, and summing circuit 106 perform similar functions as for the corresponding components for FIG. 5a. Also included in FIG. 7 is a nonlinearity d(·) 110 which models the undesired but unavoidable nonlinearity of the D/A converter at the canceller output in FIG. 2a. This nonlinearity follows an ideal D/A converter 108. Ignoring the quantization due to the D/A converter, the echo replica can be written as $$e_k = d(c_k^T \cdot a). \tag{3.14}$$

The interesting question which arises is whether the incorporation of the augmented transmitted data vector into the canceller can compensate for the (D/A) nonlinearity d(·) as well as the echo channel nonlinearity. To answer this question, note that since (3.14) is a (nonlinear) function of N bits, it follows from Section 2.2 that there exists a $2^N$-dimensional vector-valued function D[a] of a $2^N$-dimensional vector a such that $$d[c_k^T \cdot a] = c_k^T \cdot D[a] \tag{3.15}$$

where D[a] is a $2^N$-dimensional vector-valued nonlinear transformation induced by the nonlinear function d(·) on the coefficient vector a. Note that this relation is still linear in the augmented transmitted signal vector. As long as a vector can be found such that $$c_k^T \cdot g = c_k^T \cdot D(a) = d(c_k^T \cdot a) \tag{3.16}$$

for every signal vector $c_k$ then $e_k = e_k$ and in principle the echo canceller can cancel the echo completely even in the face of the nonlinearities. A simple sufficient condition for (3.16) to be possible is that the inverse D/A nonlinearity $d^{-1}(\cdot)$ exists, since then (3.16) becomes $$c_k^T \cdot a = d^{-1}(c_k^T \cdot g). \tag{3.17}$$

Since the right side of (3.17) is a function of N-bits, Section 2.2 guarantees the existence of a vector a satisfying (3.17), and further gives a procedure for finding it. It is interesting to note from (3.17) that even when the echo channel is linear (all but the N linear taps of g are zero), the canceller needs more than the N linear taps in order to compensate for the D/A nonlinearity.

The addition of extra nonlinear taps should partially or entirely mitigate the effects of D/A nonlinearity, allowing the full resolution of the D/A to be useful. There are monolithic D/A converter realizations which are inherently monotonic, which is sufficient for the existence of $d^{-1}(\cdot)$. Of course, in practice the quantization due to the D/A converter will prevent an exact cancellation of the echo.

The conclusion is that a linear canceller algorithm can still be used in the face of a nonlinear channel and nonlinear canceller implementation. What is necessary is to augment the N bits which are input to the canceller by the remaining bits in the augmented signal vector, resulting in a nonlinear canceller with $2^N$ taps. Of course, the hope is that considerably fewer taps than this will be required in practice.

3.3 Line Codes with Memory

It is often desirable to use line codes which incorporate memory for the purpose of limiting d.c. wander, RFI, crosstalk, etc. A common example is the "bipolar" or "alternate mark inversion" line code, in which a binary signal is transmitted as a three-level signal. Each input data bit $B_k=0$ is transmitted as $C_k=0$, while $B_k=1$ is transmitted alternately as $C_k=-1$ and $+1$. This example is now used to illustrate how the presence of a line code can be incorporated into the canceller design.

Figure 8:
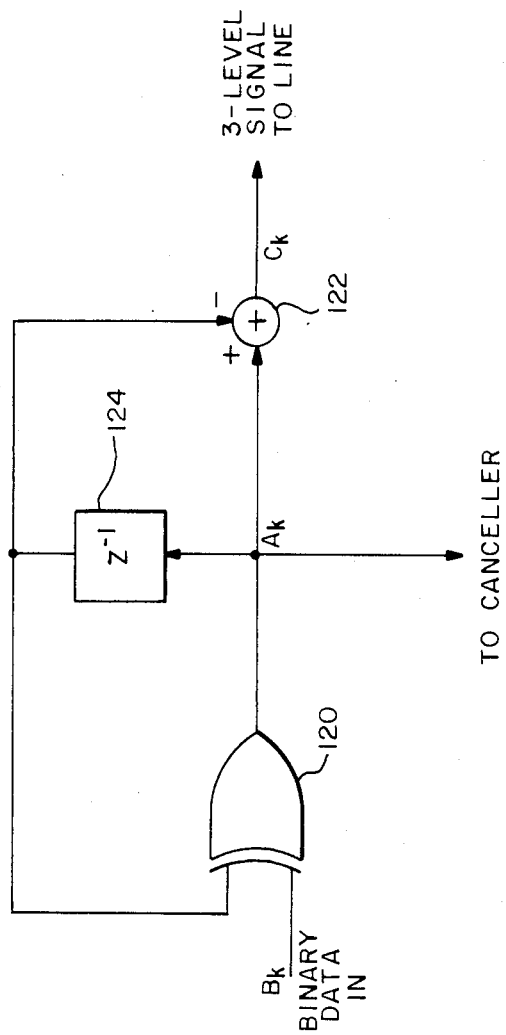
FIG. 8 depicts a bipolar encoder.

Section 3.1 shows how the three-level $C_k$ could be represented by two bits $B_{1,k}$ and $B_{2,k}$ and the transmitted level could be represented as in (3.4). In the presence of a nonlinear echo channel, the received echo signal of (3.9) can be rewritten as a function of 2N bits, and an expansion with $2^{2N}$ terms results. However, due to the fact that the signal is three-level, and due to the redundancy in the line code, many of these terms are unnecessary. For example, since $B_{1,k-1}=B_{2,k-1}=1$ can never occur in the transmitted signal, all terms in the expansion containing the product $B_{1,k-1}, B_{2,k-1}, 0 \leq 1 \leq N-1$ can be eliminated. This will reduce the number of terms in the expansion to $3^N$. In addition, the memory in the line code will reduce the number of terms further. For example, since $C_k=1$ cannot be preceded by $C_{k-1}=1$, and similarly for $-1$, the terms $B_{1,k-1}B_{1,k}$ and $B_{2,k-1}B_{2,k}$ can be eliminated. Elimination of all terms of this type will of course reduce the total number of terms to $2^N$, the number of possible input data sequences. The fact that $2^N$ terms result by such a cumbersome procedure would lead one skilled in the art to ask if there is an easier approach, and indeed there is. The bipolar encoding can be accomplished by the circuit shown in FIG. 8. A modulo 2 accumulation of all the past input bits is first performed by XOR gate 120, resulting in the binary variable $A_k$. The three-level $C_k$ is obtained by taking the difference in adder 122 of successive $A_k$. All that is necessary is input to the canceller $A_k$ rather than $C_k$, since the linear first difference filter 124 can then be thought of as being a part of the echo channel and can be easily compensated by the linear taps of the canceller. When the input data sequence is independent and equally likely, the $A_k$ are likewise independent and equally likely, and the operation of the canceller even when adaptive is not adversely affected. The canceller will require $2^N$ taps as before, but with much less effort.

3.4 Adaptation algorithm

In this Section it is shown how the usual LMS adaptation algorithm can also be used in the presence of nonlinear distortion. From FIG. 9, the residual signal after echo cancellation is $$\tau_k = e_k + s_k - \hat{e}_k + n_k \quad (3.18)$$

where $s_k$ is the data signal coming from the remote transmitter and $n_k$ the noise term, both assumed to be uncorrelated with the echo. If the data digits $C_k$ are assumed to be uncorrelated and assume with values $+1$ and $-1$ with equal probability, it is easily verified that the elements of vector $c_k$ are uncorrelated (although not independent). Then the mean-squared residual can be calculated to be $$p = E(\tau_k^2) \quad (3.19)$$
$$= (g - D(a))^T \cdot (g - D(a)) + U$$

where $$U = E(s_k^2) + E(n_k^2) \quad (3.20)$$

is the total power of the remote data signal and noise.

Assume initially that the canceller does not have a nonlinear D/A, so that $(\cdot)$ is the identify function. Then p is (3.19) is quadratic, and there is a unique global minimum which can be determined by setting the gradient of p with respect to the tap vector a to zero. This becomes $$\text{grad } p = -2(g - a) \quad (3.21)$$
$$= -2E(\tau_k c_k)$$

and the minimum p occurs as expected for equal augmented echo path vector and canceller tap vector $a=g$. To find this minimum adaptively, let the canceller tap vector a be a function of time $a_k$ and use the standard gradient algorithm, $$a_{k+1} = a_k + 2a\tau_k c_k. \quad (3.22)$$

Figure 9:
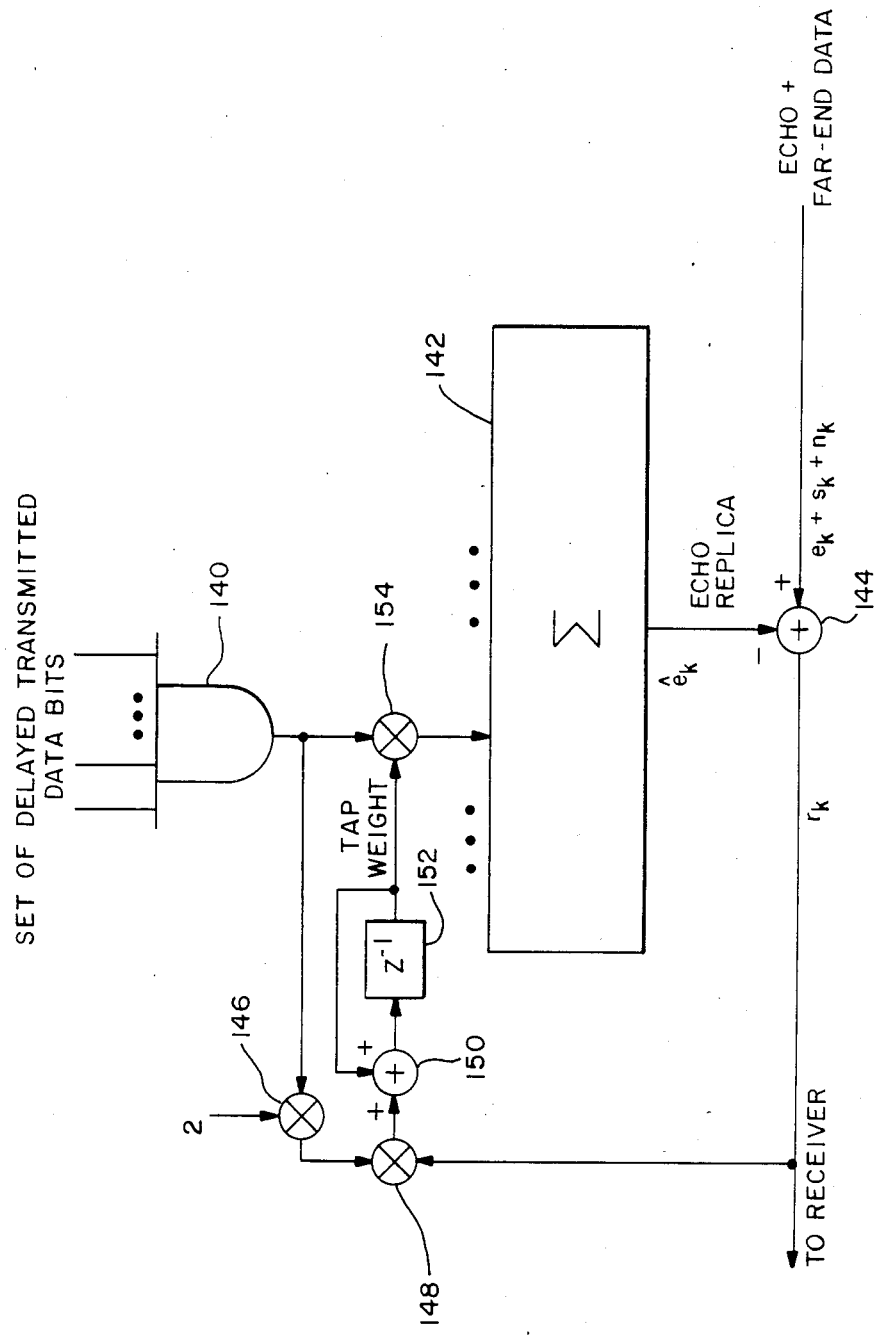
FIG. 9 depicts an adaptation of tap weight coefficients, which is the same as for a linear canceller.

This algorithm is illustrated in FIG. 9 for just one tap of the canceller. As usual, the parameter a is adjusted to obtain the desired tradeoff between convergence rate and asymptotic excess mean-square error. It is interesting that the presence of the nonlinearities in the channel has not affected the adaptation algorithm at all aside from the augmentation of the transmitted signal vector with nonlinear taps.

If there is a nonlinearity $d(\cdot)$ in the echo replica path, the gradient of (3.21) becomes $$\text{grad} p = -2\left[\frac{\partial D(a)}{\partial a}\right] \cdot (g - D[a]) \quad (3.23)$$

If the Jacobian matrix $\partial D(a)/\partial a$ is nonsingular, the unique minimum of p is obtained for $$D[a] = g \quad (3.24)$$

as in (3.16). In this case the gradient technique will also apply, since there will be no local minima in which the algorithm can get lost. The condition of nonsingularity of the matrix $\partial D(a)/\partial a$ is a very mild one, since for the case of small nonlinearity (the case of interest here), $\partial D(a)/\partial a$ differs from the identity matrix by only a small perturbation, and the small size of the perturbation ensures that the matrix is nonsingular. Further, since the function $D(a)$ is not known by the adaptation algorithm, it is necessary that $\partial D(a)/\partial a$ be replaced by the identity matrix. This is again justified for small perturbations from linearity, and results again in the standard LMS gradient algorithm of (3.22).

The speed of convergence and asymptotic residual echo can be predicted. Although the elements of the vector $c_k$ are not statistically independent, they are uncorrelated and zero-mean for the case where the data digits $C_k$ assume the values $+1$ and $-1$ with equal probability and are statistically independent. This condition is sufficient for the validity of the convergence analysis, yielding a ratio of asymptotic residual echo to uncancellable signal of $$\frac{E[e_k - \hat{e}_k]^2}{U} = \frac{\alpha L}{1 - \alpha L} \quad (3.25)$$

$$\approx \alpha L.$$

In (3.25) the number of elements in the augmented transmitted signal vector has been assumed to be M in anticipation of using only a small number of M of the $2^N$ taps. Hence, in general $M < < 2^N$ will be chosen, and the asymptotic error will be correspondingly smaller than for the table look-up canceller, where $M = 2^N$. Similarly, the speed of convergence can be measured by the rate constant of convergence, which is $$\tau = -\frac{1}{\log_e(1 - 4\alpha + 4\alpha^2 L)} \quad (3.26)$$

$$\approx \frac{1}{4\alpha}.$$

The approximations in (3.25) are valid for practical values of a, which are very small. The convergence of the linear canceller, the nonlinear canceller described herein, and the table look-up canceller can be compared by setting the asymptotic residual errors of (3.25) equal for the three cases and then comparing the time constants of (3.25). The result is that the time constant of the nonlinear canceller described herein is M/N times as great as for the linear canceller, while it is $2^N/N$ times as great for the table look-up canceller. Thus, a convergence time penalty is paid for the extra nonlinear taps (about a factor of two for the numerical examples of Section 4), but a much larger penalty for the table look-up canceller.

3.5 Truncation of the Series Expansion

In the preceding analysis, the full $2^N$-tap echo canceller has been considered. It is expected that under the conditions of (a) small nonlinearity, and (b) rapidly decaying echo path impulse response, most of the coefficients of vector a are negligible and can be ignored. This will be established in Section 4 by simulation for typical nonlinearities encountered in MOS D/A converters. However, it is important to develop a methodology by which the non-negligible taps can be predicted, in order to develop insight and to avoid an inordinate number of simulations.

If only M taps are used, it is apparent that the M taps which are largest in absolute value should be chosen. This is confirmed in (3.19), for when D(a) is constrained to have only M non-zero elements, p will be minimized by choosing those elements for which g is largest in absolute value. For small deviations from linearity this will be the same as choosing the same M elements of a to be non-zero.

If the characteristics of the echo channel nonlinearity and D/A nonlinearity are known and fairly reproducible, then the taps which are important can be predicted. This will be illustrated by example. Suppose the echo channel can be modeled by an FIR filter followed by a memoryless nonlinearity $q(\cdot)$. Then (3.1) becomes instead $$e_k = q\left(\sum_{j=0}^{N-1} h_j C_{k-j}\right) \quad (3.27)$$

Then the function $q(\cdot)$ can be expanded in or at least approximated by a Taylor series expansion. Consider for example the square term in this expansion, which becomes $$\left(\sum_{j=0}^{N-1} h_j C_{k-j}\right)^2 = \sum_{j_1=0}^{N-1} \sum_{j_2=0}^{N-1} h_{j_1} h_{j_2} C_{k-j_1} C_{k-j_2} \quad (3.28)$$

which can be simplified by eliminating the duplicated terms and noting from Section 2.2 that since $C^2_{k-j}$ is a binary function it can be represented as $$C_k^2 = a + bC_k \quad (3.29)$$

for some constants a and b. Then (3.28) becomes $$\left(\sum_{j=0}^{N-1} h_j C_{k-j}\right)^2 = \sum_{j_1=0}^{N-2} \sum_{j_2=j_1+1}^{N-1} 2h_{j_1}h_{j_2} C_{k-j_1} C_{k-j_2} + \quad (3.30)$$

$$a \sum_{j=0}^{N-1} h_j^2 + b \sum_{j=0}^{N-1} h_j^2 C_{k-j}.$$

From this relationship note that this square term contributes primarily to the second order terms in (2.1), but also to the first order term. Also note that the important terms will generally be those for which $h_{j_1}$ and $h_{j_2}$ are both large. From this one can conclude more generally that large n-th order terms in $q(\cdot)$ will contribute most heavily to n-th order terms in the expansion of (2.1), and that generally the large nonlinear taps will be those containing $C_{k-j}$ corresponding to the larger $h_j$.

When the D/A is nonlinear, and $d^{-1}(\cdot)$ must be incorporated, it can be expanded in a Taylor series and a similar analysis can be applied to (3.17) to determine which taps in a are important. There are at least two methods for obtaining the Taylor series expansion for $d^{-1}(\cdot)$. One method is to first find an analytical expression for $d^{-1}(\cdot)$, and then expand it in the Taylor series. The second method is to do a Taylor series expansion of $d(\cdot)$, and then directly find the Taylor series of its inverse. This latter procedure will be illustrated in Section 4.

Note that the validity of the expansion of (2.1) to echo cancellation does not depend on the existence of a Taylor series expansion of $d(\cdot)$ or $d^{-1}(\cdot)$, as can be seen from (3.17). When the function $d(\cdot)$ is not analytic and a Taylor series does not exist (as for example when the function is piecewise linear), then it can be approximated to any desired accuracy by a polynomial (which is a truncated Taylor series) and the procedure is as before.

4. Cancellation MSE With MOS D/A Converter

In this section computer simulations of the performance of a nonlinear echo canceller in the configuration of FIG. 2b are studied. The operation of the adaptive echo canceller derived in Section 3.5 was simulated in the presence of certain nonlinearities inherent in MOS D/A converters. The purpose of simulating the canceller, rather than using the procedure described in Section 2 for finding the coefficients of the expansion, was to establish that the adaptive algorithm does indeed work properly in the presence of nonlinearities. The asymptotic mean-square echo cancellation residual error was noted as a function of the total number of taps implemented in the canceller. The particular taps which were implemented, and the order in which they were added, was determined by first running a program which calculates all the coefficients of the expansion in accordance with the procedure of Section 2 for the particular nonlinearity being studied. The taps were then added in the order of decreasing absolute value.

In order to make the numerical examples realistic, assume the D/A converter is to be implemented in MOS technology using the technique shown in FIG. 10. The four most significant bits are provided by a string of 16 diffused resistors and the remaining bits (from 6 to 9 in simulations) by a binary weighted capacitor array. Because of diffusion concentration gradients, voltage coefficient, and photolithographic mismatches, the resistors cannot be guaranteed to be equal to within one LSB unless laser trimming is used. Thus, in the absence of trimming, a nonlinear transfer characteristic results. This nonlinearity can have a systematic component due to concentration gradients, and a random component due to photolithographic mismatches.

Two of the most common kinds of systematic nonlinearity are shown in FIG. 11. Model the transfer characteristic of FIG. 11a by $$d(x) = ax + bx^3 \quad (4.1)$$

where $a = 1.01333$ and $b = -0.01333$, and the one in FIG. 11b by $$d(x) = x + b|x|. \quad (4.2)$$

where $b = -0.005$. For the characteristic of (4.1), the nature of the inverse can be determined by finding a power series expansion for $d^{-1}(\cdot)$. Defining this power series as $$d^{-1}(y) = \sum_{n=0}^{\infty} b_n y^n \quad (4.3)$$

then $$d^{-1}(d(x)) = x \quad (4.4)$$

$$= \sum_{n=0}^{\infty} b_n (ax + bx^3)^n.$$

Equating coefficients in (4.4) and solving for the $b_n$'s $$d^{-1}(x) = \frac{1}{a} x - \frac{b}{a^4} x^3 + \frac{3b^2}{a^7} x^5 - \ldots \quad (4.5)$$

and it is seen that the third-order nonlinearity predominates in $d^{-1}(\cdot)$ as it does in $d(\cdot)$. The even harmonics are missing since the characteristic of (4.1) has odd symmetry about the origin. Thus, it is expected that the important terms in the Volterra series expansion will be the first and third order terms. For the characteristic of (4.2), the easiest method is to find $d^{-1}(\cdot)$ directly and approximate it by a polynomial. Since the nonlinear portion of this nonlinearity has even symmetry, the odd powers will be missing, and the important terms in the Volterra series will be the first and second order terms. These conclusions are confirmed by the simulations which follow.

The simple echo path impulse response assumed in all cases was $$g_k = e^{-ak}, \; k \geq 0. \quad (4.6)$$

Figure 12A:
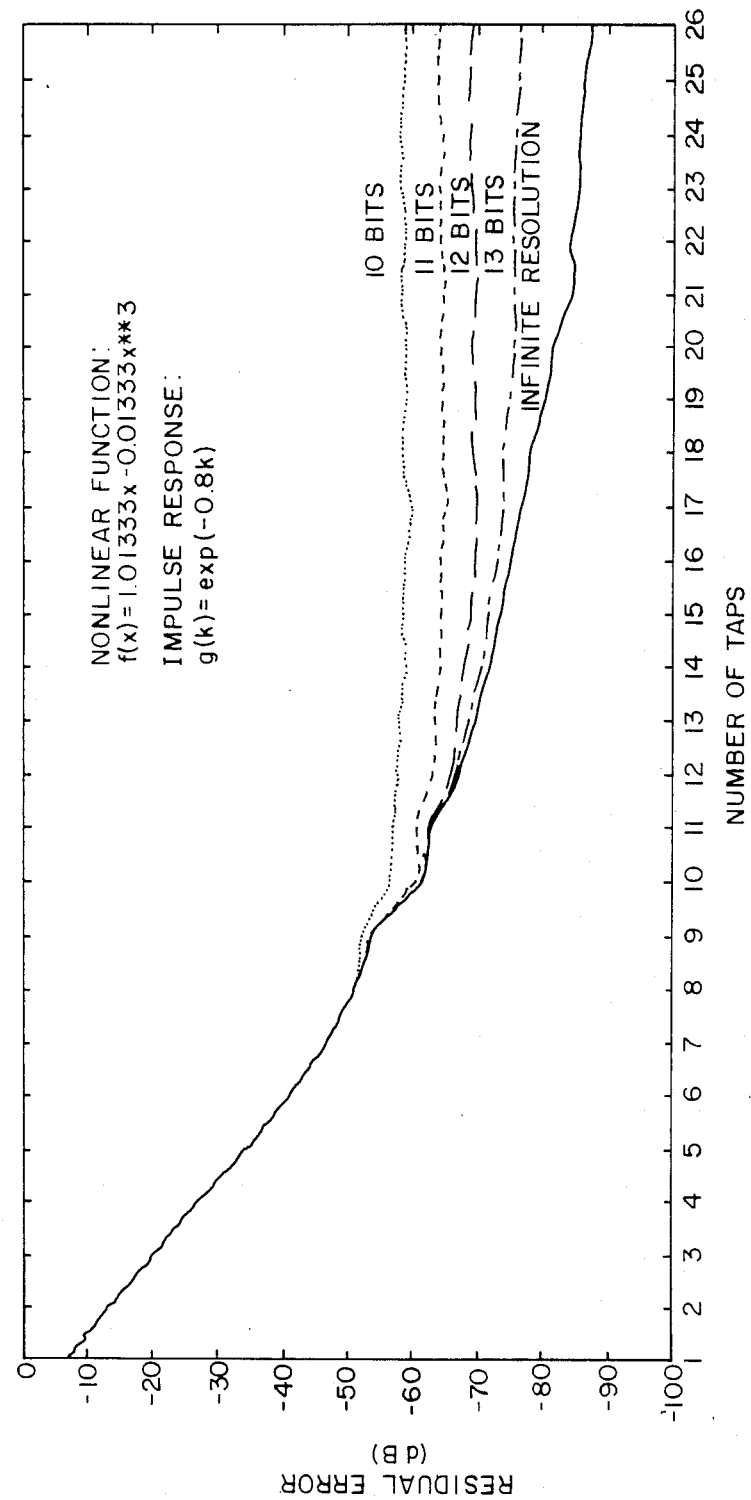
FIGS. 12a and 12b residual error as a function of the number of taps.
Figure 12B:
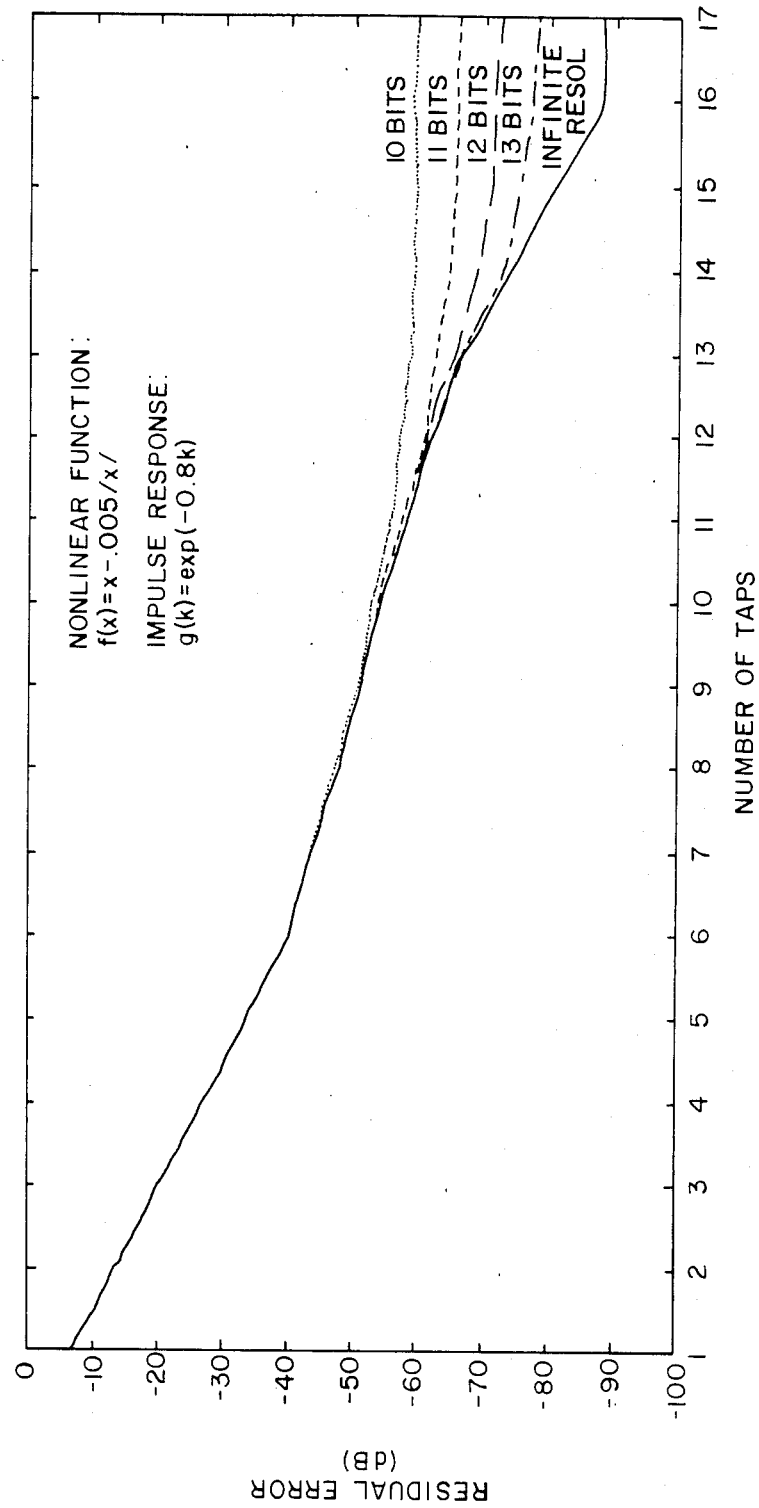

The effect of quantization was also included. Runs with 10, 11, 12 and 13 bits and with infinite resolution done, varying the number of taps from 1 to 26 in the case of FIG. 11a and from 1 to 17 for FIG. 11b. As previously mentioned, the taps were added in the order to decreasing absolute value as determined by another program. The resulting order is shown in Tables Ia and Ib together with the residual cancellation error in FIGS. 12a and 12b. Observe that in both cases many higher order taps are more important than the linear taps beyond the tenth. The importance of the nonlinear taps depends on the number of bits of quantization. With 10 bits there is no point to using nonlinear taps in FIG. 11a, whereas in FIG. 11b the nonlinear taps give about a 10 dB reduction in asymptotic residual error. For 13 bits of resolution, with a modest number of nonlinear taps, a 20 to 30 dB improvement can be obtained. In both cases, the number of taps is dramatically smaller than would be required in the table look-up method (1024 for a ten data bit cancellation).

Figure 13:
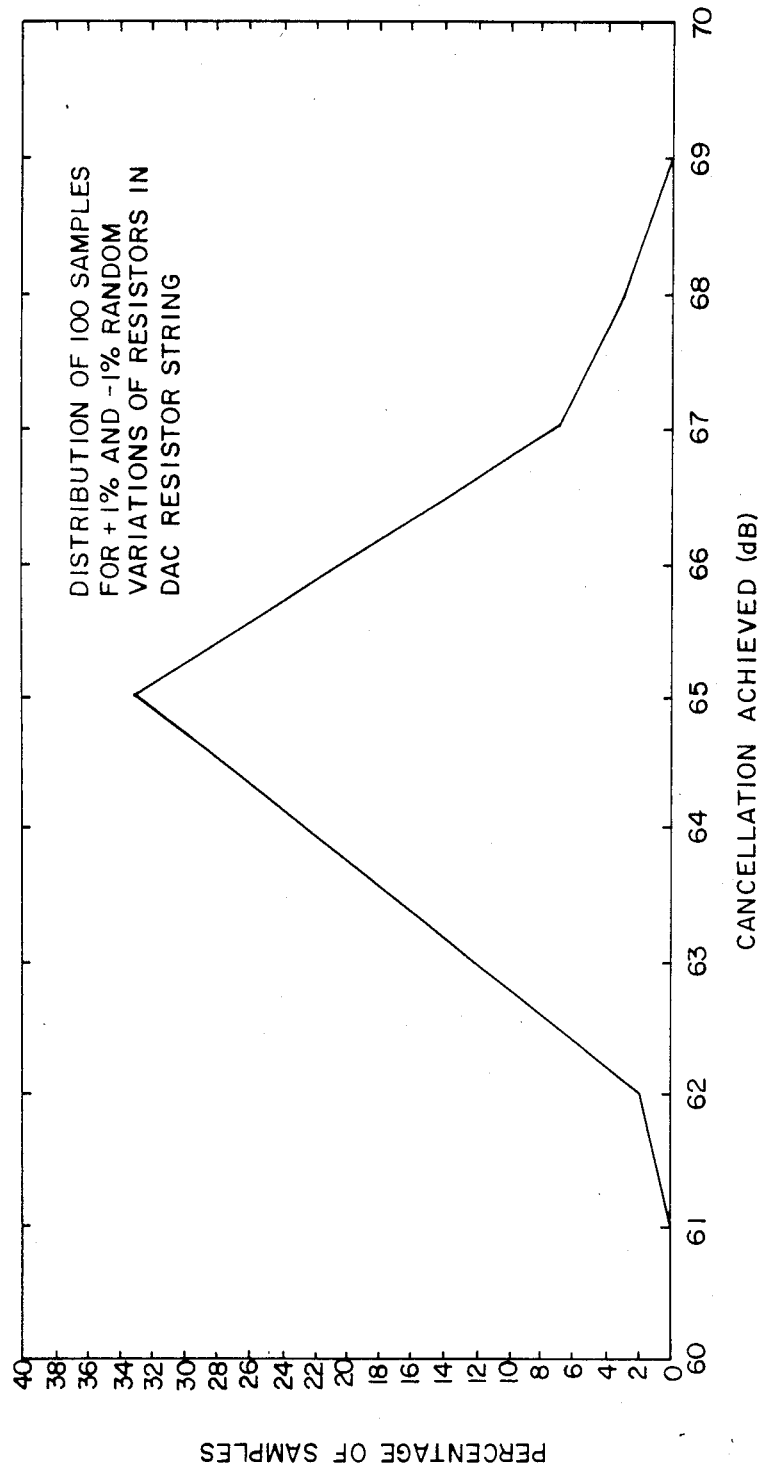
FIG. 13 depicts a histogram showing the results of random $+1\%$ and $-1\%$ random perturbations in a resistor of the 12-bit DAC of FIG. 10, for 100 samples.

The effect of random photolithographic mismatches in resistors was also simulated. Individual mismatches of either $+1\%$ or $-1\%$ (chosen randomly) were added to each of the 16 resistors of a string initially designed to implement a 12-bit D/A with the characteristic of (4.1). This level of mismatch is typical of what would be expected from an MOS process, although it is extremely unlikely that all the resistors would be simultaneously mismatched to this degree. This type of mismatch leads to a continuous piecewise linear characteristic in the D/A. In each simulation the same set of 26 taps shown in Table II were used (although many of them were very small). A histogram of the residual error in 100 randomly chosen mismatches is presented in FIG. 13. There is a considerable spread of 6 dB in the residual error, due to the choice of the same taps in each case (changing which taps were implemented for each random mismatch would presumably narrow this range and improve the cancellation). Table II shows the distribution of the maximum absolute values of the taps. Here a 0 in the intersection of column 0.001 and row $C_0C_1C_2C_3$ means that the corresponding tap was smaller than 0.001 (in absolute value) for all the 100 samples.

5. Conclusions

A technique for compensating for nonlinearities in the echo channel and the echo canceller itself has been described. It has the desirable features of requiring a modest increase in canceller complexity for mild nonlinearities and not resulting in a significant slowing of convergence. For a relatively long echo impulse response and mild nonlinearities, it achieves a dramatic reduction of complexity and speedup of convergence relative to the table look-up approach. Initial computer simulations have indicated that the increase in the number of taps is indeed modest for the type of nonlinearities in typical MOS monolithic D/A converters, and that impressive echo attenuations can be obtained using this technique in conjunction with these converters.

TABLE Ia

| | | $f(x) = 1.01333x - 0.01333x^3$ | | | |
|---|---|---|---|---|---|
| TAP NUMBER | PRODUCT TERM | NUMERICAL VALUE(*) | TAP NUMBER | PRODUCT TERM | NUMERICAL VALUE(*) |
| 0 | C0 | 0.4454855025 | 13 | C1C2C3 | 0.0000619562 |

TABLE Ia-continued $f(x) = 1.01333x - 0.01333x^3$

| TAP NUMBER | PRODUCT TERM | NUMERICAL VALUE(*) | TAP NUMBER | PRODUCT TERM | NUMERICAL VALUE(*) |
|---|---|---|---|---|---|
| 1 | C1 | 0.2010037899 | 14 | C0C2C4 | 0.0000592476 |
| 2 | C2 | 0.0904013440 | 15 | C0C1C5 | 0.0000589860 |
| 3 | C3 | 0.0406264402 | 16 | C1C2C4 | 0.0000282176 |
| 4 | C4 | 0.0182554312 | 17 | C0C3C4 | 0.0000270387 |
| 5 | C5 | 0.0082029458 | 18 | C0C2C5 | 0.0000289134 |
| 6 | C6 | 0.0036856988 | 19 | C0C1C6 | 0.0000267841 |
| 7 | C7 | 0.0016559258 | 20 | C1C2C5 | 0.0000125894 |
| 8 | C0C1C2 | 0.0009801916 | 21 | C1C3C4 | 0.0000124926 |
| 9 | C8 | 0.0007441015 | 22 | C0C2C6 | 0.0000121263 |
| 10 | C0C1C3 | 0.0002906728 | 23 | C0C1C7 | 0.0000117915 |
| 11 | C0C2C3 | 0.0001319754 | 24 | C0C3C5 | 0.0000116928 |
| 12 | C0C1C4 | 0.0001308451 | 25 | C9 | −0.0000000888 |

TABLE Ib $f(x) = x - 0.005/x/$

| TAP NUMBER | PRODUCT TERM | NUMERICAL VALUE(*) | TAP NUMBER | PRODUCT TERM | NUMERICAL VALUE(*) |
|---|---|---|---|---|---|
| 0 | C0 | 0.4493286908 | 9 | C0C1 | 0.0010097334 |
| 1 | C1 | 0.2018965483 | 10 | C9 | 0.0007465757 |
| 2 | C2 | 0.0907173827 | 11 | C0C2 | 0.0004535968 |
| 3 | C3 | 0.0407625660 | 12 | C9 | 0.0003355653 |
| 4 | C4 | 0.0183155797 | 13 | C0C3 | 0.0002040363 |
| 5 | C5 | 0.0082295639 | 14 | C0C4 | 0.0000915387 |
| 6 | C6 | 0.0036979516 | 15 | C0C5 | 0.0000415029 |
| 7 | 1 | 0.0022468669 | 16 | C1C3 | 0.0000001015 |
| 8 | C7 | 0.0016615218 | | | |

(*)Numerical values shown are for the infinite resolution case.

TABLE II

| TAP NUMBER | PRODUCT TERM | ALWAYS >0.005 | ALWAYS >0.001 | ALWAYS >0.0005 | ALWAYS >0.0001 | ALWAYS >.00005 | ALWAYS >.00001 |
|---|---|---|---|---|---|---|---|
| 0 | C0 | 1 | 1 | 1 | 1 | 1 | 1 |
| 1 | C1 | 1 | 1 | 1 | 1 | 1 | 1 |
| 2 | C2 | 1 | 1 | 1 | 1 | 1 | 1 |
| 3 | C3 | 1 | 1 | 1 | 1 | 1 | 1 |
| 4 | C4 | 1 | 1 | 1 | 1 | 1 | 1 |
| 5 | C5 | 1 | 1 | 1 | 1 | 1 | 1 |
| 6 | C6 | 0 | 1 | 1 | 1 | 1 | 1 |
| 7 | C7 | 0 | 1 | 1 | 1 | 1 | 1 |
| 8 | C8 | 0 | 0 | 1 | 1 | 1 | 1 |
| 9 | C9 | 0 | 0 | 0 | 1 | 1 | 1 |
| 10 | 1 | 0 | 1 | 1 | 1 | 1 | 1 |
| 11 | C0C1 | 0 | 1 | 1 | 1 | 1 | 1 |
| 12 | C0C2 | 0 | 0 | 1 | 1 | 1 | 1 |
| 13 | C0C3 | 0 | 0 | 0 | 1 | 1 | 1 |
| 14 | C0C4 | 0 | 0 | 0 | 0 | 1 | 1 |
| 15 | C1C2 | 0 | 0 | 1 | 1 | 1 | 1 |
| 16 | C1C3 | 0 | 0 | 0 | 1 | 1 | 1 |
| 17 | C1C4 | 0 | 0 | 0 | 1 | 1 | 1 |
| 18 | C2C3 | 0 | 0 | 0 | 1 | 1 | 1 |
| 19 | C2C4 | 0 | 0 | 0 | 1 | 1 | 1 |
| 20 | C3C4 | 0 | 0 | 0 | 0 | 1 | 1 |
| 21 | C0C1C2 | 0 | 1 | 1 | 1 | 1 | 1 |
| 22 | C0C1C3 | 0 | 0 | 1 | 1 | 1 | 1 |
| 23 | C1C2C3 | 0 | 0 | 0 | 1 | 1 | 1 |
| 24 | C0C2C3 | 0 | 0 | 0 | 1 | 1 | 1 |
| 25 | C0C1C2C3 | 0 | 0 | 0 | 1 | 1 | 1 |

What is claimed is:

1. An echo cancellation circuit comprising
means connected to receive a first bit stream corresponding to a first transmitted multilevel data signal,
means connected to receive a second transmitted data signal, said second data signal including a echo portion of said first transmitted data signal having linear and non-linear components,
means for processing said first bit stream to generate an approximate echo replica of said echo portion of said second signal, said processing means including
means for forming a set of N linear tap output signals,
means for forming a set of M-N non-linear tap output signals wherein M is greater than N but less than or equal to 2N, and
logic means for summing said linear and non-linear output signals to yield said approximate echo replica.

2. An echo cancellation circuit as in claim 1 wherein said means for processing include
means for generating a digital representation of said echo portion in said second data signal, means for converting said second data signal to a digital format to provide a digital format signal, and digital circuit means for subtracting said digital representation from said digital format signal.

3. An echo cancellation circuit as in claim 1 wherein said means for processing include means for generating a digital representation of said echo portion in said second data signal, means for converting said digital representation to an analog representation of the echo replica to form an analog echo replica, and analog circuit means for subtracting said analog echo replica from the second data signal.

4. An echo cancellation circuit as in claim 1 including means for storing N past bits from said first bit stream, means for combining said N bits with N tap weights thereby forming said set of N linear tap output signals, means for combining said N bits with M-N non-linear tap weights thereby forming said set of M-N non-linear tap output signals, and means for subtracting said approximate echo replica from said second data signal.

5. An echo cancellation circuit as in claim 4 including means for receiving a set of two or more bits from the N bits in storage, means for generating a logical combination output bit of said set of two or more bits, means for generating a state signal which is either a first state or a second state in response to said output bit, and means for multiplying said state signal by said M-N non-linear tap weights.

6. An echo cancellation circuit as a claim 5 wherein said logical combination is a module 2 summation and wherein said first and second states represent a $+1$ and a $-1$ respectively.

7. An echo cancellation circuit as in claim 5 wherein said logical combination is a logical AND and said first and second states represent a 1 and an 0 respectively.

8. In an echo cancellation circuit, an echo cancellation method comprising the steps of:

receiving a first bit stream corresponding to a first transmitted multilevel data signal, receiving a second transmitted data signal, said second data signal including an echo portion of said first data signal having linear and non-linear components, processing said first bit stream to generate an approximate replica of the echo signal portion of said second data signal, and subtracting said approximate echo replica from the second data signal to yield a substantially echo-free replica of the second data signal, the method further including the steps of forming a set of N linear tap output signals, forming a set of M-N non-linear tap output signals wherein M is greater than N but less than or equal to $2^N$, and logically summing said linear and non-linear tap output signals to yield said approximate echo replica.

* * * * *